US012454137B2

(12) United States Patent
Eto et al.

(10) Patent No.: US 12,454,137 B2
(45) Date of Patent: Oct. 28, 2025

(54) INKJET RECORDING DEVICE

(71) Applicant: KYOCERA CORPORATION, Kyoto (JP)

(72) Inventors: Daisuke Eto, Kyoto (JP); Masahiro Higashitani, Kyoto (JP); Hiroatsu Tamai, Kyoto (JP); Masaaki Maruta, Kyoto (JP); Tomoya Hotani, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 225 days.

(21) Appl. No.: 18/249,971

(22) PCT Filed: Oct. 27, 2021

(86) PCT No.: PCT/JP2021/039718
§ 371 (c)(1),
(2) Date: Apr. 21, 2023

(87) PCT Pub. No.: WO2022/092171
PCT Pub. Date: May 5, 2022

(65) Prior Publication Data

US 2023/0391083 A1 Dec. 7, 2023

(30) Foreign Application Priority Data

Oct. 30, 2020 (JP) ................................ 2020-183075

(51) Int. Cl.

| | |
|---|---|
| ***B41J 2/21*** | (2006.01) |
| ***B41J 2/14*** | (2006.01) |
| *B41J 2/15* | (2006.01) |

(52) U.S. Cl.
CPC ........... *B41J 2/2114* (2013.01); *B41J 2/1433* (2013.01); *B41J 2/15* (2013.01); *B41J 2202/19* (2013.01); *B41J 2202/20* (2013.01)

(58) Field of Classification Search
CPC ........ B41J 2/2114; B41J 2/15; B41J 2202/19; B41J 2202/20
See application file for complete search history.

(56) References Cited

U.S. PATENT DOCUMENTS 6,439,708 B1 8/2002 Kato et al.
12,076,994 B2 * 9/2024 Eto ........................ B41J 2/2103
(Continued)

FOREIGN PATENT DOCUMENTS

CN 104309309 A 1/2015
EP 1022151 A1 7/2000
(Continued)

*Primary Examiner* — Geoffrey S Mruk
(74) *Attorney, Agent, or Firm* — HAUPTMAN HAM, LLP

(57) ABSTRACT

An inkjet recording device includes a conveyance unit, a carriage, ink heads, and a plurality of processing heads. The conveyance unit conveys a recording medium in a predetermined conveyance direction. The carriage reciprocates in a main scanning direction intersecting the conveyance direction. The ink heads are mounted on the carriage so as to be aligned in the main scanning direction, and eject ink for image formation. The processing heads are mounted on the carriage and eject a non-coloring processing solution. The plurality of processing heads are arranged side by side in the main scanning direction at positions different from the ink head in the conveyance direction.

16 Claims, 16 Drawing Sheets

(56) References Cited

U.S. PATENT DOCUMENTS

| | | | | |
|---|---|---|---|---|
| 2005/0179725 | A1 | 8/2005 | Matsushima | |
| 2015/0328911 | A1 * | 11/2015 | Garcia Maza | B41J 19/142 347/37 |
| 2018/0304625 | A1 | 10/2018 | Kayahara et al. | |
| 2019/0264056 | A1 | 8/2019 | Okuda et al. | |
| 2020/0276850 | A1 | 9/2020 | Urano et al. | |
| 2024/0025188 | A1 * | 1/2024 | Eto | B41J 29/38 |
| 2024/0034071 | A1 * | 2/2024 | Eto | B41J 25/001 |

FOREIGN PATENT DOCUMENTS

| | | | |
|---|---|---|---|
| JP | H1044388 | A | 2/1998 |
| JP | 2005254806 | A | 9/2005 |
| JP | 201137228 | A | 2/2011 |
| JP | 2011173252 | A | 9/2011 |
| JP | 2019147307 | A | 9/2019 |
| JP | 2020138454 | A | 9/2020 |

* cited by examiner

INKJET RECORDING DEVICE

RELATED APPLICATIONS

The present application is a National Phase of International Application Number PCT/JP2021/039718 filed Oct. 27, 2021, which claims the benefit of priority from Japanese Patent Application No. 2020-183075, filed on Oct. 30, 2020.

TECHNICAL FIELD

The present disclosure relates to an inkjet recording device including an ink head mounted on a carriage that moves in a main scanning direction.

BACKGROUND ART

An inkjet recording device such as an inkjet printer includes an ink head that ejects ink for image formation toward a recording medium. For example, in a case where a recording medium is a fiber sheet such as a woven fabric or a knitted fabric, or a plastic sheet, it may be necessary to apply a preprocessing solution and a postprocessing solution to the recording medium before and after ejecting ink toward the recording medium (e.g., Patent Literature 1). The preprocessing solution is, for example, a processing solution for improving fixability of ink to a recording medium and aggregability of an ink pigment. The postprocessing solution is, for example, a processing solution that enhances fastness of a printed image. In this case, the inkjet recording device includes a processing head that ejects the preprocessing solution and the postprocessing solution in addition to the ink head.

In a case where a recording medium has a wide width, the ink head and the processing head described above are mounted on a carriage that reciprocates in a main scanning direction. In recording processing, the recording medium is intermittently fed in a predetermined conveyance direction (sub-scanning direction), and the carriage is reciprocated in the main scanning direction while the recording medium is stopped. When the carriage moves, ink and a processing solution are ejected from the ink head and the processing head, respectively.

CITATION LIST

Patent Literature

Patent Literature 1: JP 2019-147307 A

SUMMARY OF INVENTION

An inkjet recording device according to one aspect of the present disclosure includes a conveyance unit, a carriage, ink heads, and a plurality of processing heads. The conveyance unit conveys a recording medium in a predetermined conveyance direction. The carriage reciprocates in a main scanning direction intersecting the conveyance direction. The ink heads are mounted on the carriage so as to be aligned in the main scanning direction, and eject ink for image formation. The processing heads are mounted on the carriage and eject a non-coloring processing solution. The plurality of processing heads are arranged side by side in the main scanning direction at positions different from the ink head in the conveyance direction.

DESCRIPTION OF EMBODIMENT

In the following, an embodiment of the present disclosure will be described with reference to the drawings. In the present embodiment, as a specific example of an inkjet recording device, there will be exemplified an inkjet printer including an ink head that ejects ink for image formation on a wide and long recording medium. The inkjet printer of the present embodiment is suitable for digital textile printing in which images such as characters and patterns are printed on a recording medium made of fabric such as woven fabric and knitted fabric by an inkjet method. As a matter of course, the inkjet recording device according to the present disclosure is also applicable for printing various inkjet images on a recording medium such as a paper sheet or a resin sheet.

Overall Configuration of Inkjet Printer

Figure 1:
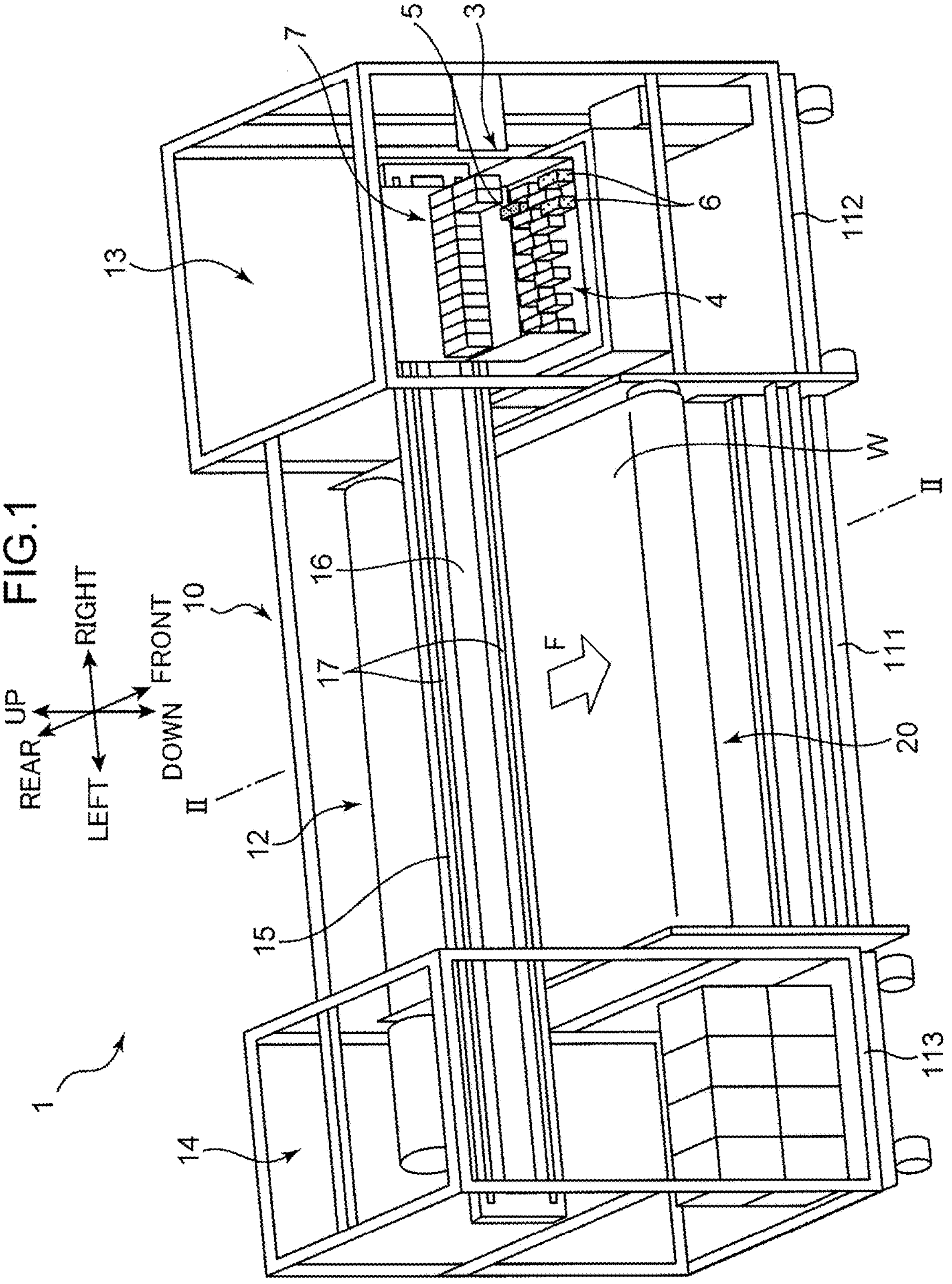
FIG. 1 is a perspective view illustrating an overall configuration of an inkjet printer according to an embodiment of the present disclosure.
Figure 2:
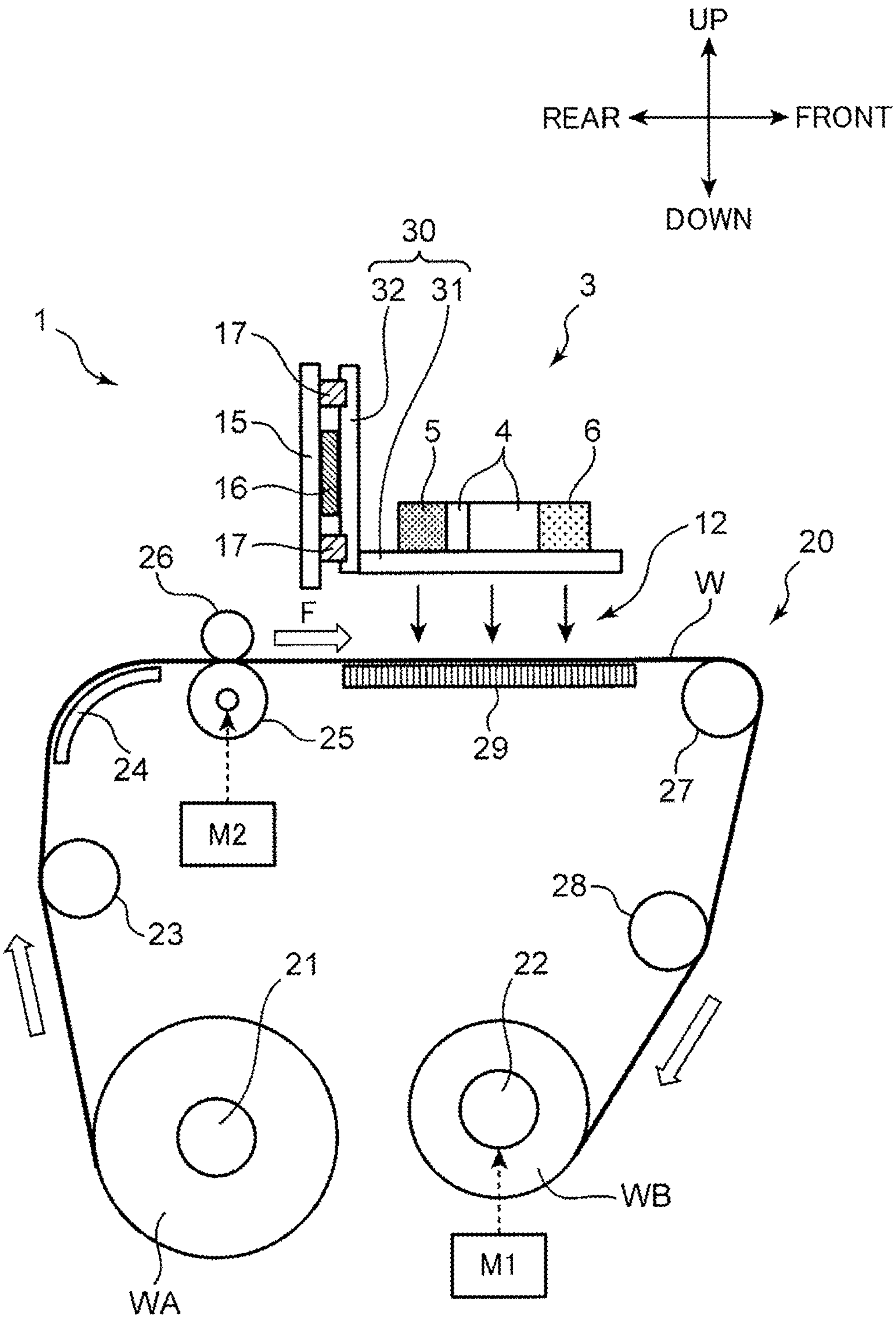
FIG. 2 is a schematic cross-sectional view taken along line II-II in FIG. 1.

FIG. 1 is a perspective view showing an overall configuration of an inkjet printer 1 according to the one embodiment of the present disclosure, and FIG. 2 is a schematic cross-sectional view taken along line II-II of FIG. 1. The inkjet printer 1 is a printer that prints an image on a wide and long workpiece W (recording medium) by an inkjet method, and includes a device frame 10, and a workpiece conveyance unit 20 (conveyance unit) and a carriage 3 incorporated in the device frame 10. In the present embodiment, a left-right direction is a main scanning direction at the time of printing on the workpiece W, and a direction from the rear toward the front is a sub-scanning direction (conveyance direction F of the workpiece W).

The device frame 10 forms a frame for mounting various constituent members of the inkjet printer 1. The workpiece conveyance unit 20 is a mechanism that intermittently feeds the workpiece W so that the workpiece W advances, in the conveyance direction F from the rear toward the front, in a printing region where inkjet printing processing is executed. The carriage 3 has mounted thereon an ink head 4, a preprocessing head 5, a postprocessing head 6, and a sub-tank 7, and reciprocates in the left-right direction during the inkjet printing processing.

The device frame 10 includes a center frame 111, a right frame 112, and a left frame 113. The center frame 111 forms a frame for mounting various constituent members of the inkjet printer 1, and has a right-left width corresponding to the workpiece conveyance unit 20. The right frame 112 and the left frame 113 stand on the right and left of the center frame 111, respectively. Between the right frame 112 and the left frame 113 is a printing area 12 in which printing processing is executed on the workpiece W.

The right frame 112 forms a maintenance area 13. The maintenance area 13 is an area where the carriage 3 is retracted when the printing processing is not executed. In the maintenance area 13, cleaning processing, purge processing, and the like of ejection ports of the ink head 4, the preprocessing head 5, and the postprocessing head 6 are executed, and a cap is fitted thereto. The left frame 113 forms a turnaround area 14 of the carriage 3. The turnaround area 14 is a region where the carriage 3 that has scanned the printing area 12 from the right side to the left side in the printing processing temporarily enters before executing scanning in a reverse direction.

A carriage guide 15 for causing the carriage 3 to reciprocate in the left-right direction is assembled on an upper side of the device frame 10. The carriage guide 15 is a flat plate-shaped member elongated in the left-right direction, and is arranged above the workpiece conveyance unit A timing belt 16 (moving member) is assembled to the carriage guide 15 so as to be able to circulate in the left-right direction (the main scanning direction). The timing belt 16 is an endless belt, and is driven to circulate in the left direction or the right direction by a drive source (not illustrated).

The carriage guide 15 is provided with a pair of upper and lower guide rails 17 so as to extend in parallel in the left-right direction, the upper and lower guide rails being holding members for holding the carriage 3. The carriage 3 is engaged with the guide rails 17. In addition, the carriage 3 is fixed to the timing belt 16. The carriage 3 moves in the left direction or the right direction along the carriage guide 15 while being guided by the guide rails 17 as the timing belt 16 circulates in the left direction or the right direction.

With reference mainly to FIG. 2, the workpiece conveyance unit 20 includes a feed roller 21 that draws out the workpiece W before printing and a take-up roller 22 that winds up the workpiece W having been printed. The feed roller 21 is arranged at a lower rear part of the device frame 10, and is a winding shaft of a feed roll WA which is a winder of the workpiece W before printing. The take-up roller 22 is arranged at a lower front part of the device frame 10, and is a winding shaft of a winding roll WB which is a winder of the workpiece W after the printing processing. The take-up roller 22 is provided with a first motor M1 that rotationally drives the take-up roller 22 around an axis to execute winding operation of the workpiece W.

A path provided between the feed roller 21 and the take-up roller 22 and passing through the printing area 12 is a conveyance path of the workpiece W. On the conveyance path, a first tension roller 23, a workpiece guide 24, a conveyance roller 25, a pinch roller 26, a turnaround roller 27, and a second tension roller 28 are arranged in order from an upstream side. The first tension roller 23 applies a predetermined tension to the workpiece W on an upstream side of the conveyance roller 25. The workpiece guide 24 changes the conveyance direction of the workpiece W from upward to a front direction to bring the workpiece W into the printing area 12.

The conveyance roller 25 is a roller that generates a conveyance force for intermittently feeding the workpiece W in the printing area 12. The conveyance roller 25 is rotationally driven about an axis by a second motor M2, and intermittently conveys the workpiece W in the front direction (predetermined conveyance direction F) so that the workpiece W passes through the printing area 12 (image forming position) opposed to the carriage 3. The pinch roller 26 is arranged so as to be opposed to the conveyance roller 25 from above, and forms a conveyance nip portion with the conveyance roller 25.

The turnaround roller 27 changes the conveyance direction of the workpiece W having passed through the printing area 12 from the front direction to downward, and guides the workpiece W after the printing processing to the take-up roller 22. The second tension roller 28 applies a predetermined tension to the workpiece W on a downstream side of the conveyance roller 25. A platen 29 is arranged in the printing area 12 below the conveyance path of the workpiece W.

The carriage 3 reciprocates in the main scanning direction (the left-right direction in the present embodiment) intersecting (orthogonal to, in the present embodiment) the conveyance direction F in a state of being cantilevered by the guide rail 17. The carriage 3 includes a carriage frame 30, and the ink head 4, the preprocessing head 5, the postprocessing head 6, and the sub-tank 7 mounted on the carriage frame 30. The carriage frame 30 includes a head support frame 31 and a back frame 32 (engagement portion).

The head support frame 31 is a horizontal plate that holds the above-described heads 4 to 6. The back frame 32 is a vertical plate extending upward from a rear end edge of the head support frame 31. As described above, the timing belt 16 is fixed to the back frame 32. In addition, the guide rail 17 is engaged with the back frame 32. In other words, in the present embodiment, the back frame 32 is an engagement portion held by the guide rail 17 in a cantilevered state. The head support frame 31 is a horizontal plate whose rear end side is cantilevered by the engagement portion.

The cantilevered state represents a state in which the engagement portion (back frame 32) is present in the carriage 3 only from the center to one side of the carriage 3, an upstream side or a downstream side, in the conveyance direction F, and no other engagement portion is present on the side opposite to the side where the engagement portion is present. The engagement portion is a portion held by the guide rails 17 which is the holding member. The engagement portion may be further arranged in a range other than the range in which the ink head 4 and the processing heads are arranged in the conveyance direction F. Specifically, the engagement portion may be arranged only on an upstream side or only on a downstream side with respect to the range in which the ink head 4 and the processing heads are arranged in the conveyance direction F.

Details of Carriage

Figure 3:
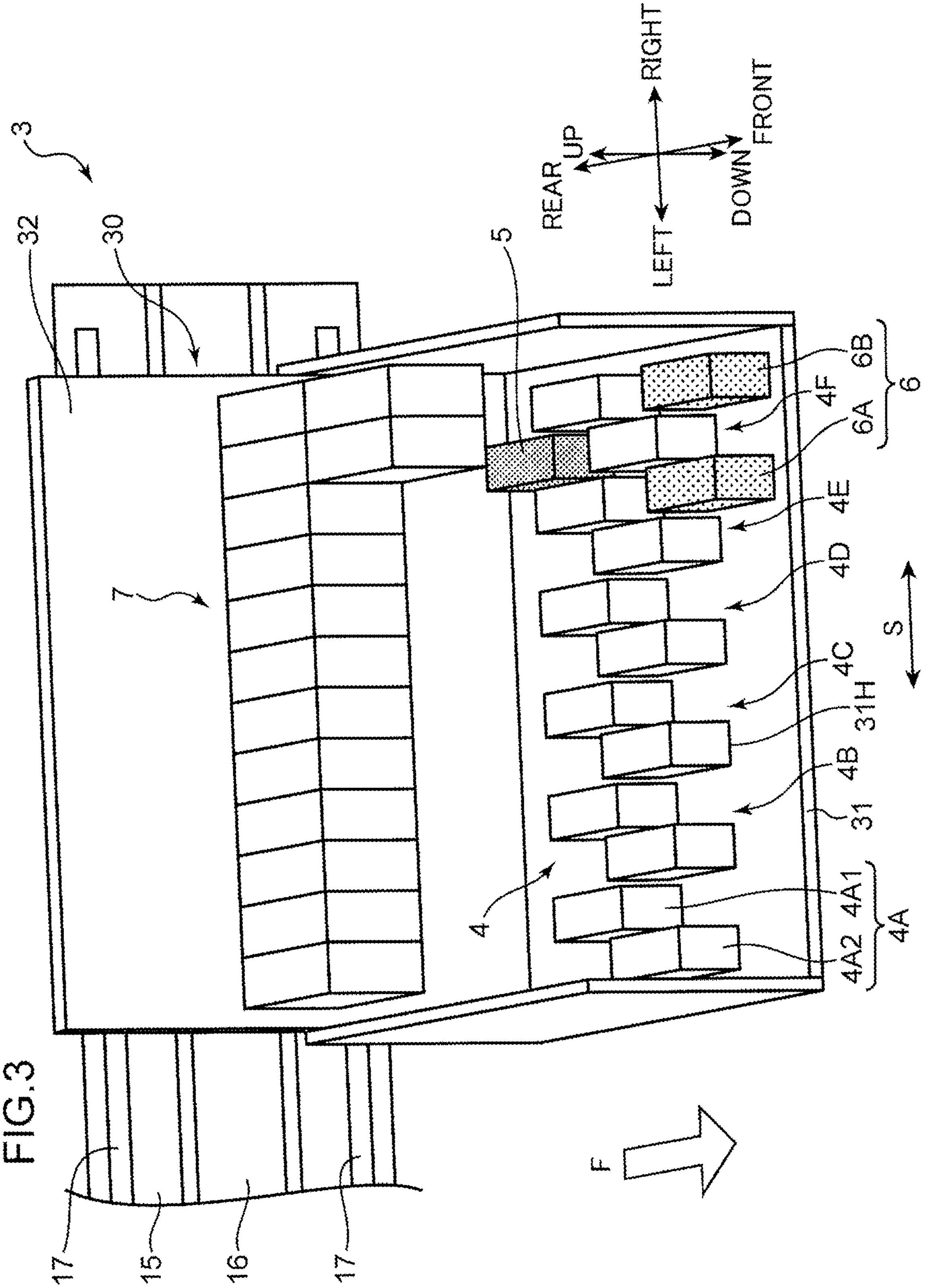
FIG. 3 is an enlarged perspective view of a carriage illustrated in FIG. 1.

The carriage 3 will be further described. FIG. 3 is an enlarged perspective view of the carriage 3 illustrated in FIG. 1. FIG. 3 illustrates the conveyance direction F (sub-scanning direction) of the workpiece W and the main scanning direction S which is a moving direction of the carriage 3. FIG. 3 shows an example in which a plurality of ink heads 4 that eject ink for image formation on the workpiece W, the preprocessing head 5 and the postprocessing head 6 that eject non-coloring processing solutions, and a plurality of the sub-tanks 7 that supply the ink and the processing solutions to these heads 4 to 6 are mounted on the carriage 3.

Each of the ink heads 4 includes a large number of nozzles (ink ejection holes) that eject ink droplets by an ejection method such as a piezoelectric method using a piezoelectric element or a thermal method using a heating element, and an ink passage that guides ink to the nozzles. As the ink, for example, an aqueous pigment ink containing an aqueous solvent, a pigment, and a binder resin can be used. The plurality of ink heads 4 in the present embodiment include first to sixth ink heads 4A to 4F that respectively eject inks of six different colors. For example, the first ink head 4A ejects orange (first color) ink, the second ink head 4B ejects green (second color) ink, the third ink head 4C ejects yellow ink, the fourth ink head 4D ejects red ink, the fifth ink head 4E ejects blue ink, and the sixth ink head 4F ejects black ink.

The ink heads 4A to 4F of the respective colors are mounted on the head support frame 31 of the carriage 3 so as to be aligned in the main scanning direction S. Each of the ink heads 4A to 4F for the respective colors has two heads. For example, the first ink head 4A is configured with an upstream side head 4A1 arranged on an upstream side in the conveyance direction F, and a downstream side head 4A2 arranged at a position downstream of the upstream side head 4A1 and shifted to the left side in the main scanning direction S. The same applies to the ink heads 4B to 4F of the other colors. The respective upstream side heads of the ink heads 4B to 4F are aligned in the main scanning direction S at the same position as the upstream side head 4A1 in the conveyance direction F, and the respective downstream side heads are aligned in the main scanning direction S at the same position as the downstream side head 4A2 in the conveyance direction F.

The preprocessing head 5 and the postprocessing head 6 are arranged at positions different from the ink head 4 in the conveyance direction F. The preprocessing head 5 is arranged upstream of the ink head 4 in the conveyance direction F. FIG. 3 shows the example in which one preprocessing head 5 is arranged near a right end of an array of the ink heads 4. By contrast, the postprocessing head 6 is arranged downstream of the ink head 4 in the conveyance direction F. FIG. 3 shows the example in which two postprocessing heads 6A and 6B (a plurality of processing heads) are arranged to be aligned in the main scanning direction S in the vicinity of the right end of the array of the ink heads 4. Various arrangement patterns of the ink head 4, the preprocessing head 5, and the postprocessing head 6 in the carriage 3 will be detailed in Examples 1 to 11 to be described later.

As used in the above description, a series of the heads along the main scanning direction S configured by the ink head 4 and the postprocessing head 6 is referred to as a line of the heads or simply as a line. The line of the heads may include the preprocessing head 5. A series of the heads along the conveyance direction F configured by the ink head 4, the preprocessing head 5, and the postprocessing head 6 is referred to as a row of the heads or simply as a line.

The preprocessing head 5 ejects a preprocessing solution for applying predetermined preprocessing to the workpiece W. The preprocessing solution is ejected from the preprocessing head 5 to a position of the workpiece W to which no ink has yet been ejected from the ink head 4. The preprocessing solution is a non-coloring processing solution that does not develop color even if it adheres to the workpiece W, and is, for example, a processing solution that exhibits a function of enhancing fixability of ink to the workpiece W, aggregability of an ink pigment, and the like. As such a preprocessing solution, a processing solution obtained by blending a binder resin in a solvent, a processing solution obtained by blending a cationic resin positively charged in a solvent, or the like can be used.

The postprocessing head 6 ejects a postprocessing solution for applying predetermined postprocessing to the workpiece W to which ink is adhered. The postprocessing solution is ejected from the postprocessing head 6 to a position of the workpiece W to which ink has been ejected from the ink head 4. Similarly, the postprocessing solution is a non-coloring processing solution that does not develop color even if it adheres to the workpiece W, and is a processing solution that exhibits a function of enhancing fixability and fastness (resistance to rubbing and scraping) of an ink image printed on the workpiece W by the ink head 4. As such a postprocessing solution, a silicone-based processing solution or the like can be used.

Here, the non-coloring processing solution represents a processing solution that prevents a person from recognizing, with naked eyes, color development when the solution is printed alone on a recording medium. The color here includes black, white, gray, and the like having zero saturation. Although the non-coloring processing solution is basically a transparent liquid, for example, when one liter of the processing solution is viewed in a liquid state, the solution may appear slightly white or the like, not completely transparent. Since such color is very light, when the color is printed alone on a recording medium, a person cannot recognize with naked eyes that the color is developed. Although when a recording medium is printed alone with some type of processing solution, the recording medium might have a change such as generation of gloss, such a state is not considered color development.

In the present embodiment, the preprocessing solution and the postprocessing solution may be ejected onto substantially the entire surface of the workpiece W, or the preprocessing solution and the postprocessing solution may be selectively ejected in accordance with an image to be printed, similarly to ink.

Subsequently, a case where the preprocessing solution and the postprocessing solution are selectively ejected will be described. As described above, the preprocessing solution, the ink, and the postprocessing solution are ejected in this order to a part of the workpiece W where the color is printed in accordance with the image. In this case, the ink may be of one color or of a plurality of colors. In other words, neither the preprocessing solution nor the postprocessing solution is ejected to a part where no color is printed, i.e., a part where no ink is ejected. In order to adjust quality of an image to be printed, texture of the workpiece W, and the like, a part of ejection of the preprocessing solution and the postprocessing solution may be selected so as to be different from ejection of the ink.

Openings 31H are provided at head arrangement positions of the head support frame 31. The ink heads 4A to 4F, the preprocessing head 5, and the postprocessing head 6 are assembled to the head support frame 31 so as to be fitted into the respective openings 31H. A nozzle arranged on a lower end surface of each of the heads 4, 5, and 6 is exposed from each opening 31H.

The sub-tank 7 is supported by the carriage 3 at a position above the heads 4, 5, and 6 via a holding frame (not illustrated). The sub-tank 7 is provided corresponding to each of the heads 4, and 6. Ink or processing solution (not illustrated) is supplied to each sub-tank 7 from a cartridge or a main tank in which the ink and the processing solution are stored. Each sub-tank 7 supplies the ink or the processing solution to each of the heads 4, 5, and 6. Each of the sub-tanks 7 and the heads 4, 5, and 6 are connected by a pipeline (P1, P2, P3 illustrated in FIG. 16) not illustrated in FIG. 3.

As described above, the inkjet printer 1 according to the present embodiment is an all-in-one printer in which the three types of heads, the ink head 4, the preprocessing head 5, and the postprocessing head 6 are mounted on one carriage 3. According to the printer 1, for example, in a printing step of executing inkjet printing on fabric in digital textile printing, a step of ejecting the preprocessing solution and a step of ejecting the postprocessing solution can be executed integrally. Therefore, a textile printing step can be simplified, and a textile printing device can be made compact.

Printing Method

Figure 4:
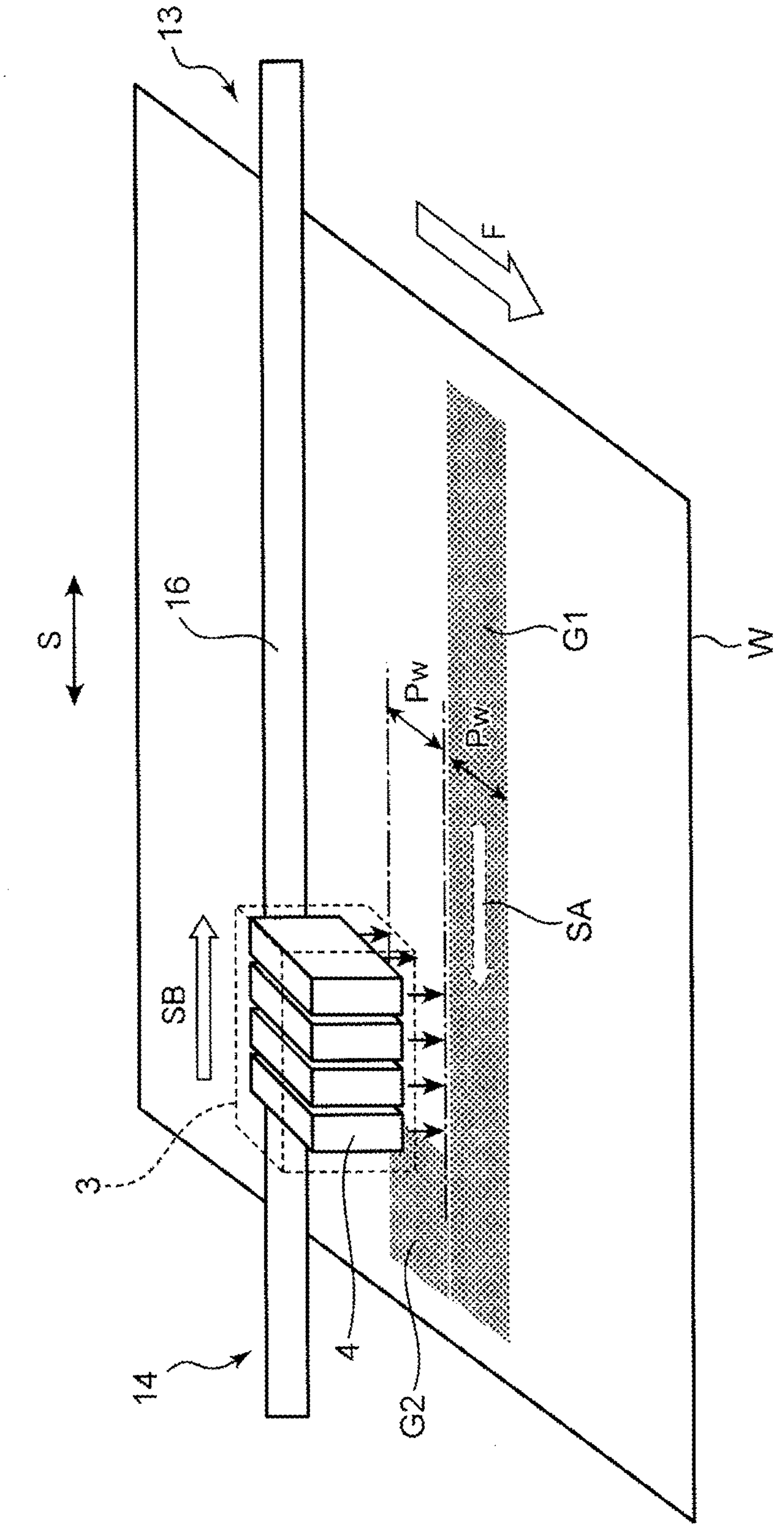
FIG. 4 is a schematic view illustrating a serial printing method adopted in the present embodiment.

Subsequently, a printing method executed by the inkjet printer 1 according to the present embodiment will be described. The inkjet printer 1 performs the printing processing on the workpiece W by a serial printing method. FIG. 4 is a schematic view illustrating the serial printing method. In FIG. 4, the carriage 3 is simply drawn without the preprocessing head 5 and the postprocessing head 6.

In a case where the workpiece W has a size with a large width, printing cannot be performed while continuously feeding the workpiece W. The serial printing method is a printing method of repeating reciprocating movement of the carriage 3 on which the ink heads 4 of the respective colors are mounted in the main scanning direction S and intermittent feeding of the workpiece W in the conveyance direction F. Here, it is assumed that the ink head 4 has a predetermined print width Pw in the conveyance direction F. The print width Pw is substantially equal to an array range of ink ejection nozzles of the ink head 4.

In FIG. 4 and FIG. 5 to be described below, a width of each head in the conveyance direction F and the print width Pw are drawn substantially equal. Actually, the width of each head in the conveyance direction F is larger than the print width Pw and the array range of the ejection nozzles.

FIG. 4 illustrates a state in which the carriage 3 has moved in a forward direction SA in the main scanning direction S and the printing of a band-shaped image G1 having the print width Pw is completed. At the time of scanning in the forward direction SA, the feeding of the workpiece W is stopped. After the band-shaped image G1 is printed, the workpiece W is fed in the conveyance direction F by a pitch corresponding to the print width Pw. At this time, the carriage 3 waits in the turnaround area 14 on a left end side. After the feeding of the workpiece W, the carriage 3 turns around in a backward direction SB along with reverse movement of the timing belt 16. The workpiece W is in a stopped state. Then, as illustrated in FIG. 4, the carriage 3 prints a band-shaped image G2 having the print width Pw on an upstream side of the band-shaped image G1 while moving in the backward direction SB. Hereinafter, the same operation is repeated.

Figure 5A:
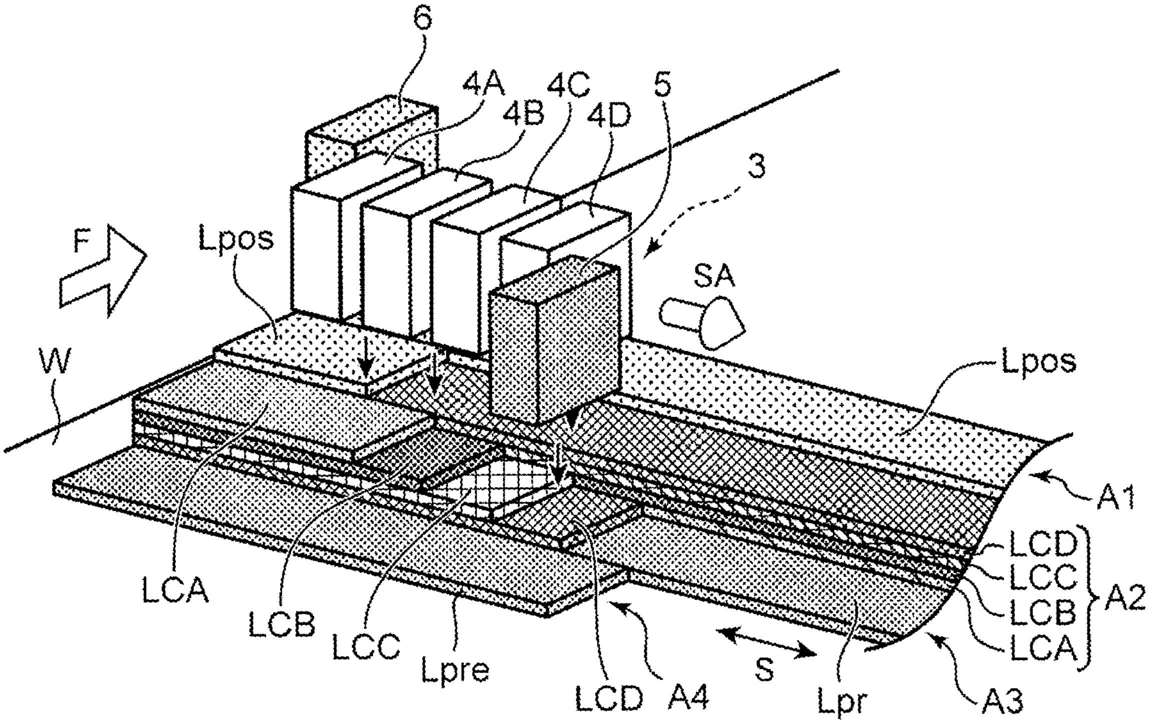
FIG. 5A is a schematic view illustrating a printing state in a forward path and a backward path of the carriage.
Figure 5B:
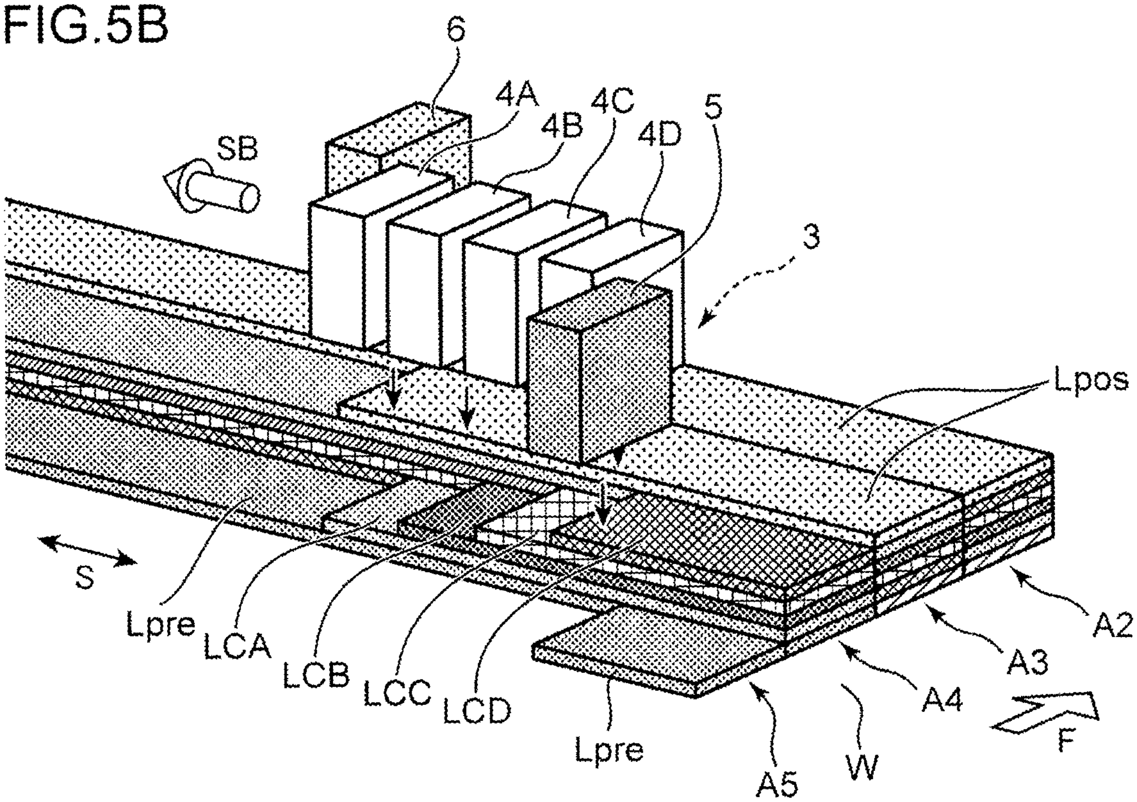
FIG. 5B is a schematic view illustrating a printing state in the forward path and the backward path of the carriage.

FIGS. 5A and 5B are schematic views illustrating a printing state on the forward path and the backward path of the carriage 3. Here, the ink head 4, the preprocessing head 5, and the postprocessing head 6 mounted on the carriage 3 are simply illustrated. The ink head 4 includes the first, second, third, and fourth ink heads 4A, 4B, 4C, and 4D for ejecting inks of first, second, third, and fourth colors different from each other. The first to fourth ink heads 4A to 4D are aligned in the main scanning direction S. The preprocessing head 5 is arranged upstream of the ink head 4 in the conveyance direction F, and the postprocessing head 6 is arranged downstream of the same.

FIG. 5A illustrates a state in which while moving in the forward direction SA in the main scanning direction S, the carriage 3 is performing printing operation (forward scan). A region A4 on the workpiece W is a region to which the preprocessing head 5 mounted on the most upstream side of the carriage 3 is opposed. In the forward scan this time, a preprocessing layer Lpre is formed on the region A4 by the preprocessing solution ejected from the preprocessing head 5.

A region A3 is a region located downstream of the region A4 by one scan, and is a region to which the ink head 4 is opposed. On the region A3, the preprocessing layer Lpre has already been formed over the entire length in the main scanning direction by the backward scan last time. In the forward scan this time, first, second, third, and fourth ink layers LCA, LCB, LCC, and LCD are formed on the preprocessing layer Lpre in the region A3 by the inks of the first to fourth colors sequentially ejected in the order of arrangement of the first to fourth ink heads 4A to 4D. Although in FIG. 5A, the fourth to first ink layers LCD to LCA are illustrated to be sequentially laminated for easy understanding, the ink layers are not actually laminated. Note that the above-described preprocessing layer Lpre and a postprocessing layer Lpos to be described later are not formed on the workpiece W.

A region A2 is a region located downstream of the region A3 by one scan, and is a region to which the postprocessing head 6 mounted on the most downstream side of the carriage 3 is opposed. On the region A2, the preprocessing layer Lpre by the forward scan last time and the first to fourth ink layers LCA to LCD by the backward scan last time are already formed over the entire length in the main scanning direction. In the forward scan this time, the postprocessing layer Lpos is formed on the first to fourth ink layers LCA to LCD in the region A2 by the postprocessing solution ejected from the postprocessing head 6.

A region A1 is a region downstream of the region A2 by one scan, and is a region through which the carriage 3 has passed and the printing processing is completed. In other words, in the region A1, the preprocessing layer Lpre, the first to fourth ink layers LCA to LCD, and the postprocessing layer Lpos are formed over the entire length in the main scanning direction.

FIG. 5B illustrates a state in which after the forward scan shown in FIG. 5A is finished, the carriage 3 turns around to perform the backward scan while moving in the backward direction SB. Before the turnaround movement, the workpiece W is fed in the conveyance direction F by one pitch. A region A5 on the workpiece W is a region located upstream of the region A4 by one scan, and is a region to which the preprocessing head 5 is opposed in the backward scan this time. The preprocessing layer Lpre is formed on the region A5 by the preprocessing solution ejected from the preprocessing head 5.

In the region A4 and the region A3, the first to fourth ink layers LCA to LCD and the postprocessing layer Lpos are formed on the existing layers, respectively. Specifically, in the region A4, the first to fourth ink layers LCA to LCD are formed on the preprocessing layer Lpre. In the region A3, the postprocessing layer Lpos is formed on the first to fourth ink layers LCA to LCD. The region A2 is a region where the printing processing is completed subsequently to the region A1.

The reason why the printing processing can be performed in both the forward scan and the backward scan as described above is that the preprocessing head 5 and the postprocessing head 6 are shifted in the conveyance direction F with respect to the ink head 4. In a case where the preprocessing head 5, the ink head 4, and the postprocessing head 6 are aligned in the carriage 3 in this order in the main scanning direction S, the printing processing enabling a desired landing order of the preprocessing solution and the postprocessing solution to be secured can be realized only by one of the forward or backward scan. In order to enable two-way printing processing, a pair of the preprocessing head 5 and the postprocessing head 6 needs to be arranged on both sides of the array of the ink heads 4. In this case, a width of the carriage 3 in the main scanning direction S is increased. Since such arrangement is unnecessary in the present embodiment, the width of the carriage 3 in the main scanning direction S can be reduced.

Various Modes of Head Arrangement

In the following, various arrangement examples of the ink head 4, the preprocessing head 5, and the postprocessing head 6 on the carriage 3 will be illustrated as Examples 1 to 11. Examples 1 to 11 show an example in which both the preprocessing head 5 and the postprocessing head 6 are included as the processing head. However, as long as a plurality of at least either the preprocessing heads 5 or the postprocessing heads 6 are provided and arranged side by side in the main scanning direction at a position different from the ink head 4 in the conveyance direction F, either the preprocessing head 5 or the postprocessing head 6 can be omitted.

Example 1

Figure 6:
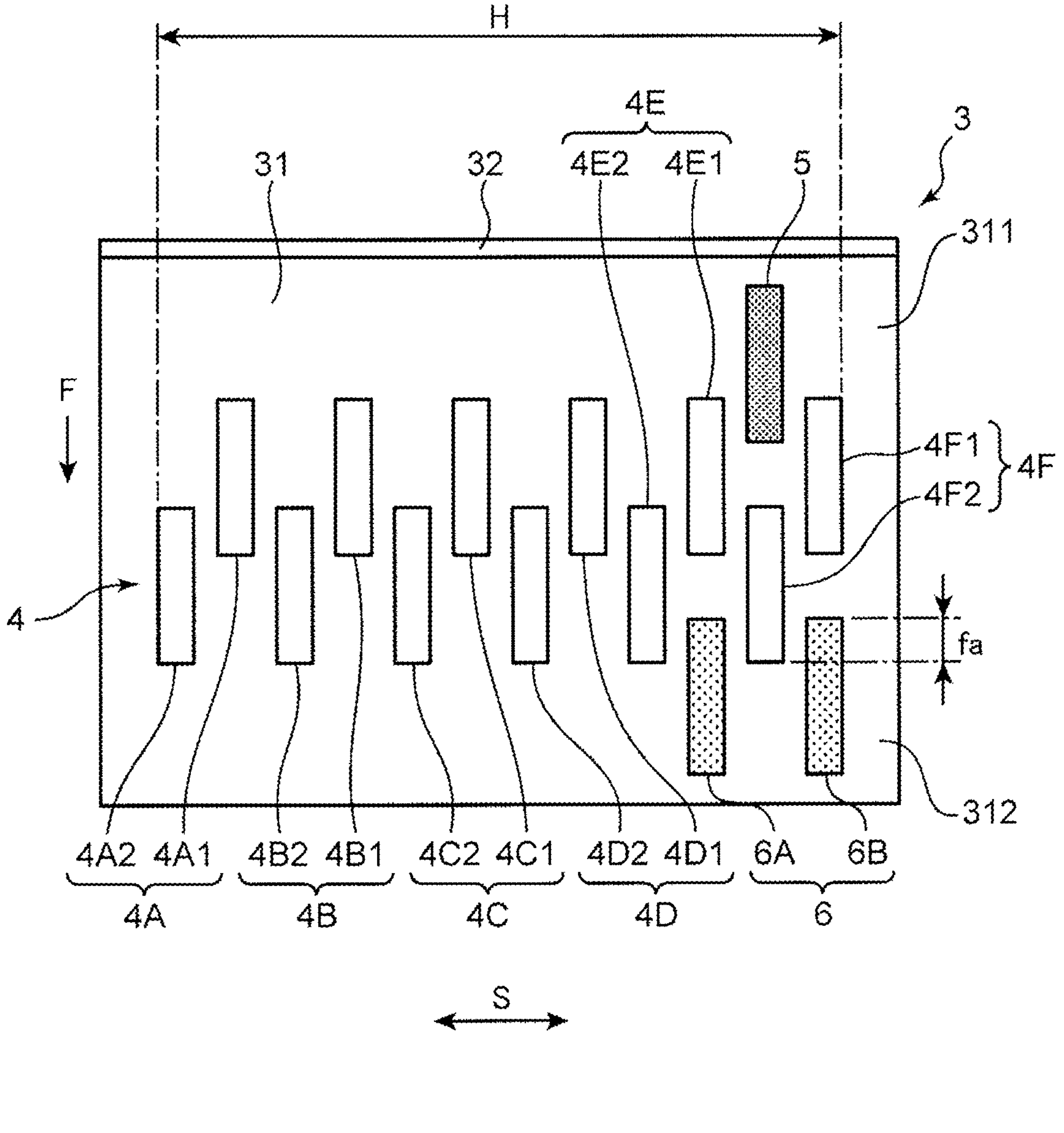
FIG. 6 is a plan view schematically illustrating head arrangement according to Example 1, the view showing arrangement of an ink head and a processing head in the carriage illustrated in FIG. 3.

FIG. 6 is a plan view schematically showing head arrangement according to Example 1. FIG. 6 is a view showing arrangement of the ink head 4, the preprocessing head 5, and the postprocessing head 6 (the plurality of processing heads) in the carriage 3 shown in FIG. 3. As described above, on the head support frame 31 of the carriage 3, the first to sixth ink heads 4A to 4F that respectively eject inks of six different colors, the preprocessing head 5, and the postprocessing head 6 are mounted. Each of the ink heads 4A to 4F of the respective colors includes two unit heads (12 in total). While the number of the preprocessing heads 5 is one, two postprocessing heads 6 are provided.

Groups of the first to sixth ink heads 4A to 4F constituting the ink head 4 are arrayed so as to be aligned in the main scanning direction S in a central region in the conveyance direction F of the head support frame 31. The preprocessing head 5 is arranged upstream of the ink head 4 in the conveyance direction F and on a proximal end side 311 of the head support frame 31. On the other hand, the postprocessing heads 6 are arranged on the downstream side of the ink head 4 in the conveyance direction F and on a distal end side 312 of the head support frame 31. The preprocessing head 5 and the postprocessing head 6 are both arranged near one end (right end) of the head support frame 31 in the main scanning direction S.

The first ink head 4A includes the upstream side head 4A1 and the downstream side head 4A2 arranged downstream of the upstream side head 4A1. In other words, the upstream side head 4A1 and the downstream side head 4A2 are arrayed in the conveyance direction F. An arrangement position of the upstream side head 4A1 is a position closer to the proximal end side 311 in the central region of the head support frame 31. An arrangement position of the downstream side head 4A2 is a position closer to the distal end side 312 in the central region of the head support frame 31. The downstream side head 4A2 is arranged at a position shifted to one side (left side) in the main scanning direction S with respect to the upstream side head 4A1, and is arranged at a position partially overlapping with the upstream side head in the conveyance direction F. As a matter of course, the upstream side head 4A1 and the downstream side head 4A2 may be arranged at the same position in the main scanning direction S (positions linearly aligned in the conveyance direction F). The arrangement of the present example is, however, advantageous in that the size of the carriage 3 in the conveyance direction F can be reduced.

The second to sixth ink heads 4B to 4F also include upstream side heads 4B1, 4C1, 4D1, 4E1, and 4F1 and downstream side heads 4B2, 4C2, 4D2, 4E2, and 4F2, respectively, which are similar to the upstream side head 4A1 and the downstream side head 4A2 described above. The upstream side heads 4A1 to 4F1 of the first to sixth ink heads 4A to 4F are aligned at the same position in the conveyance direction F and at predetermined intervals in the main scanning direction S. The downstream side heads 4A2 to 4F2 are also aligned at the same position in the conveyance direction F and at predetermined intervals in the main scanning direction S. As a result, a staggered arrangement mode is formed in which parts of the downstream side heads 4A2 to 4F2 are interposed between arrangement pitches of the upstream side heads 4A1 to 4F1, respectively.

The preprocessing head 5 is arranged so as to be partially interposed between a pair of adjacent ink heads in the main scanning direction S. Specifically, the preprocessing head 5 has a positional relationship having its downstream portion interposed between the upstream side head 4E1 of the fifth ink head 4E and the upstream side head 4F1 of the sixth ink head 4F.

The postprocessing head 6 includes the first postprocessing head 6A and the second postprocessing head 6B arranged side by side in the main scanning direction S. FIG. 6 shows an example in which the first postprocessing head 6A and the second postprocessing head 6B are arranged at the same position in the conveyance direction F and side by side at predetermined intervals in the main scanning direction S. The first postprocessing head 6A is arranged so as to have its upstream portion interposed between the downstream side head 4E2 of the fifth ink head 4E and the downstream side head 4F2 of the sixth ink head 4F. The second postprocessing head 6B is arranged on the right side of the downstream side head 4F2 and at the same position as the upstream side head 4F1 in the main scanning direction S. With this arrangement, the first and second postprocessing heads 6A and 6B are set to have an overlapping region fa with the downstream side heads 4E2 and 4F2, respectively, in the conveyance direction F.

In the conveyance direction F, a width of each head is larger than the print width Pw and the array range of the ejection nozzles. Therefore, each head is arranged to have the overlapping region fa in order not to have a space between the print width Pw of the head in each line and the print width Pw of the head in the adjacent line.

As a result of the head arrangement described above, the preprocessing head 5 and the postprocessing head 6 are arranged within a range of an arrangement width H of the ink head 4 in the main scanning direction S. The ink head 4 has the arrangement width H between the downstream side head 4A2 of the first ink head 4A and the upstream side head 4F1 of the sixth ink head 4F in the main scanning direction S. The preprocessing head 5 is arranged upstream of the ink head 4 within the range of the arrangement width H, and the postprocessing head 6 is arranged downstream of the ink head 4 within the range of the arrangement width H.

According to the head arrangement according to Example 1 described above, it is possible to secure necessary ejection amounts of ink and a processing solution while reducing the size of the carriage 3. In other words, the preprocessing head 5 and the postprocessing head 6 are arranged at positions different from the ink head 4 in the conveyance direction F. With this configuration, a main scanning direction width of the carriage necessary for mounting the heads 4 to 6 can be shortened while arraying the ink heads 4A to 4F capable of securing a necessary ink ejection amount in the main scanning direction S and while enabling the printing processing in both the forward scan and the backward scan. Furthermore, the postprocessing head 6 is configured with the plurality of first and second postprocessing heads 6A and 6B, which are arranged side by side in the main scanning direction S. Therefore, even when an ejection amount of the postprocessing solution is insufficient with a single head, the necessary ejection amount can be secured by arranging the plurality of postprocessing heads 6A and 6B.

The first to sixth ink heads 4A to 4F include the upstream side heads 4A1 to 4F1 and the downstream side heads 4A2 to 4F2 arrayed in the conveyance direction F (direction intersecting an array direction of the plurality of processing heads), respectively. Therefore, even if the number of the ink heads 4 is increased in order to increase the ejection amount of the ink of each color or to achieve multicoloring, it is possible to make the width of the carriage 3 in the main scanning direction be hardly increased.

The preprocessing head 5 and the postprocessing head 6 are arranged within the range of the arrangement width H of the first to sixth ink heads 4A to 4F in the main scanning direction S. Therefore, even when the preprocessing head 5 and the postprocessing head 6 are mounted on the carriage 3 in addition to the ink head 4, it is not necessary to extend the width of the carriage 3 in the main scanning direction. In other words, it is possible to make the width of the carriage 3 in the main scanning direction be hardly increased.

The preprocessing head 5 and the postprocessing head 6 are arranged so as to have a part thereof interposed between array pitches of the first to sixth ink heads 4A to 4F. Focusing on the first postprocessing head 6A, a part of the first postprocessing head 6A is interposed between the pair of downstream side heads 4E2 and 4F2. Such staggered arrangement enables the ink head 4 and the processing heads 5 and 6 arranged at different positions in the conveyance direction F to be arranged at high density in the conveyance direction F. Accordingly, a width of the carriage 3 in the conveyance direction F can be reduced.

In the head arrangement of Example 1, one preprocessing head 5 is arranged on the upstream side of the ink head 4 in the conveyance direction F, and two postprocessing heads 6A and 6B are arranged on the downstream side. In other words, it is possible to provide the all-in-one inkjet printer 1 in which all of the ejection heads for the preprocessing solution, the ink, and the postprocessing solution are mounted on one carriage 3. Furthermore, since the preprocessing head 5, the ink head 4, and the postprocessing head 6 are sequentially arranged in the conveyance direction F, a desirable landing order of the preprocessing solution, the ink, and the postprocessing solution on the workpiece W can be secured in both the forward scan and the backward scan.

The carriage 3 has the back frame 32 (engagement portion) that is held in the cantilevered state by the guide rail 17 (holding member). The carriage 3 is cantilevered by the timing belt 16, so that the structure can be simplified. In addition, cantilevering easily realizes a structure in which the downstream side of the carriage 3 is opened, and facilitates maintenance of the ink head 4 and the processing heads 5 and 6.

In the carriage 3 thus cantilevered, the preprocessing head 5 is arranged on the proximal end side 311 (the side close to the engagement portion) of the head support frame 31, and the postprocessing head 6 is arranged on the distal end side 312 (the side far from the engagement portion). Unlike the proximal end side 311 close to the back frame 32 fixed to the timing belt 16, it is assumed that positional accuracy inevitably decreases on the distal end side 312 which is a free end. However, on the distal end side 312, there is mounted the postprocessing head 6 that is not relatively required to be highly severe in ejection accuracy. Since the postprocessing solution serves for coating an ink image printed on the workpiece W, even when the landing position deviates, a relative degree of influence on an image quality can be reduced as compared with a case where the preprocessing solution has the same degree of landing position deviation. Accordingly, even when the cantilevered carriage 3 is used, it is possible to make image quality hardly deteriorate.

Example 2

Figure 7:
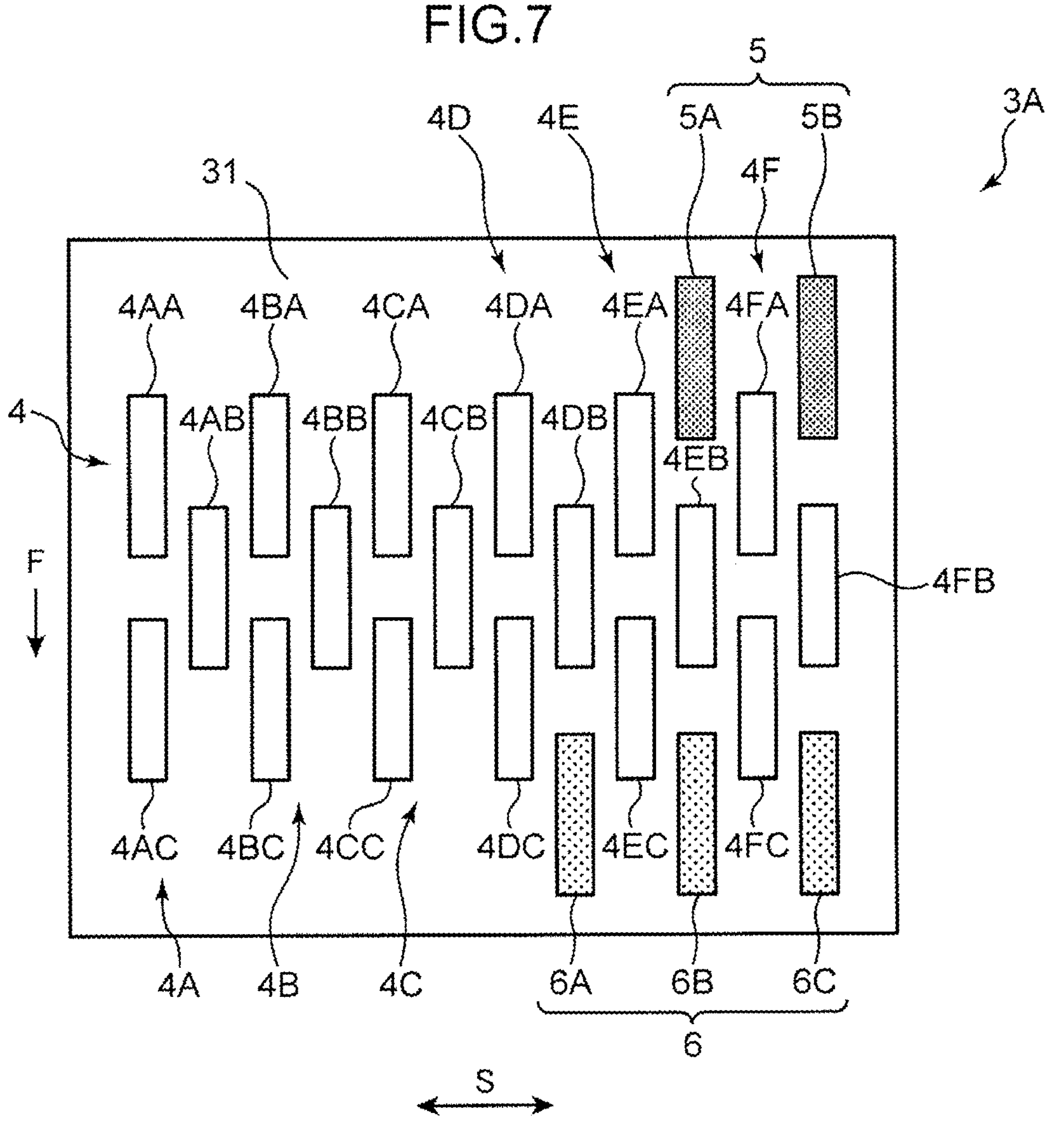
FIG. 7 is a plan view of a carriage showing head arrangement according to Example 2.

FIG. 7 is a plan view schematically showing a carriage 3A having head arrangement according to Example 2. Although a head arrangement method is similar to that of Example 1, it is different from that of Example 1 in that the number of unit heads of each head is increased. Specifically, Example 2 is the same as Example 1 in that the ink head 4 includes the first to sixth ink heads 4A to 4F that eject inks of six colors different from each other, respectively. By contrast, each of the ink heads 4A to 4F of the respective colors in Example 2 includes three unit heads (18 in total). The preprocessing head 5 arranged on the upstream side in the conveyance direction F of the ink head 4 includes two unit heads, and the postprocessing head 6 arranged on the downstream side includes three unit heads. The preprocessing head 5 and the postprocessing head 6 are arranged within the range of the arrangement width of the ink head 4 in the main scanning direction S, which is the same as Example 1.

The first ink head 4A includes an upstream head 4AA, a central head 4AB, and a downstream head 4AC as the unit heads. The upstream head 4AA is arranged on a most upstream side in the conveyance direction F of the carriage 3A. The downstream head 4AC is arranged downstream of the upstream head 4AA at the same position as the upstream head 4AA in the main scanning direction S. The central head 4AB is shifted rightward in the main scanning direction S with respect to the upstream head 4AA and the downstream head 4AC, and is arranged downstream of the upstream head 4AA and upstream of the downstream head 4AC in the conveyance direction F. The central head 4AB is arranged at a position partially overlapping the upstream head 4AA and the downstream head 4AC in the conveyance direction F.

The second to sixth ink heads 4B to 4F also include upstream heads 4BA, 4CA, 4DA, 4EA, and 4FA, central heads 4BB, 4CB, 4DB, 4EB, and 4FB, and downstream heads 4BC, 4CC, 4DC, 4EC, and 4FC, which are similar to the upstream head 4AA, the central head 4AB, and the downstream head 4AC described above. The upstream heads 4AA to 4FA, the central heads 4BB to 4FB, and the downstream heads 4BC to 4FC of the first to sixth ink heads 4A to 4F are aligned at the same position in the conveyance direction F and at predetermined intervals in the main scanning direction S.

The preprocessing head 5 includes a first preprocessing head 5A and a second preprocessing head 5B arranged at the same position in the conveyance direction F and spaced apart side by side in the main scanning direction S. The first preprocessing head 5A is arranged so as to have a part of its downstream portion interposed between the upstream head 4EA of the fifth ink head 4E and the upstream head 4FA of the sixth ink head 4F. The second preprocessing head 5B is arranged on the right side of the upstream head 4FA and at the same position as the central head 4FB in the main scanning direction S.

The postprocessing head 6 includes a first postprocessing head 6A, a second postprocessing head 6B, and a third postprocessing head 6C arranged at the same position in the conveyance direction F and spaced apart side by side in the main scanning direction S. The first postprocessing head 6A is arranged so as to have a part of its upstream portion interposed between the downstream head 4DC of the fourth ink head 4D and the downstream head 4EC of the fifth ink head 4E. The second postprocessing head 6B is arranged so as to have a part of its upstream portion interposed between the downstream head 4EC of the fifth ink head 4E and the downstream head 4FC of the sixth ink head 4F. The third postprocessing head 6C is arranged on the right side of the downstream head 4FC and at the same position as the central head 4FB in the main scanning direction S.

According to the head arrangement according to Example 2, advantages similar to those of Example 1 can be obtained. In other words, it is possible to secure necessary ejection amounts of ink and a processing solution while reducing the size of the carriage 3A. In particular, in Example 2, since both the preprocessing head 5 and the postprocessing head 6 include a plurality of unit heads, it is possible to secure sufficient ejection amounts of the preprocessing solution and the postprocessing solution. Since the first to sixth ink heads 4A to 4F also include the unit heads arranged in three lines, a sufficient ejection amount of ink can also be secured.

Example 3

Figure 8:
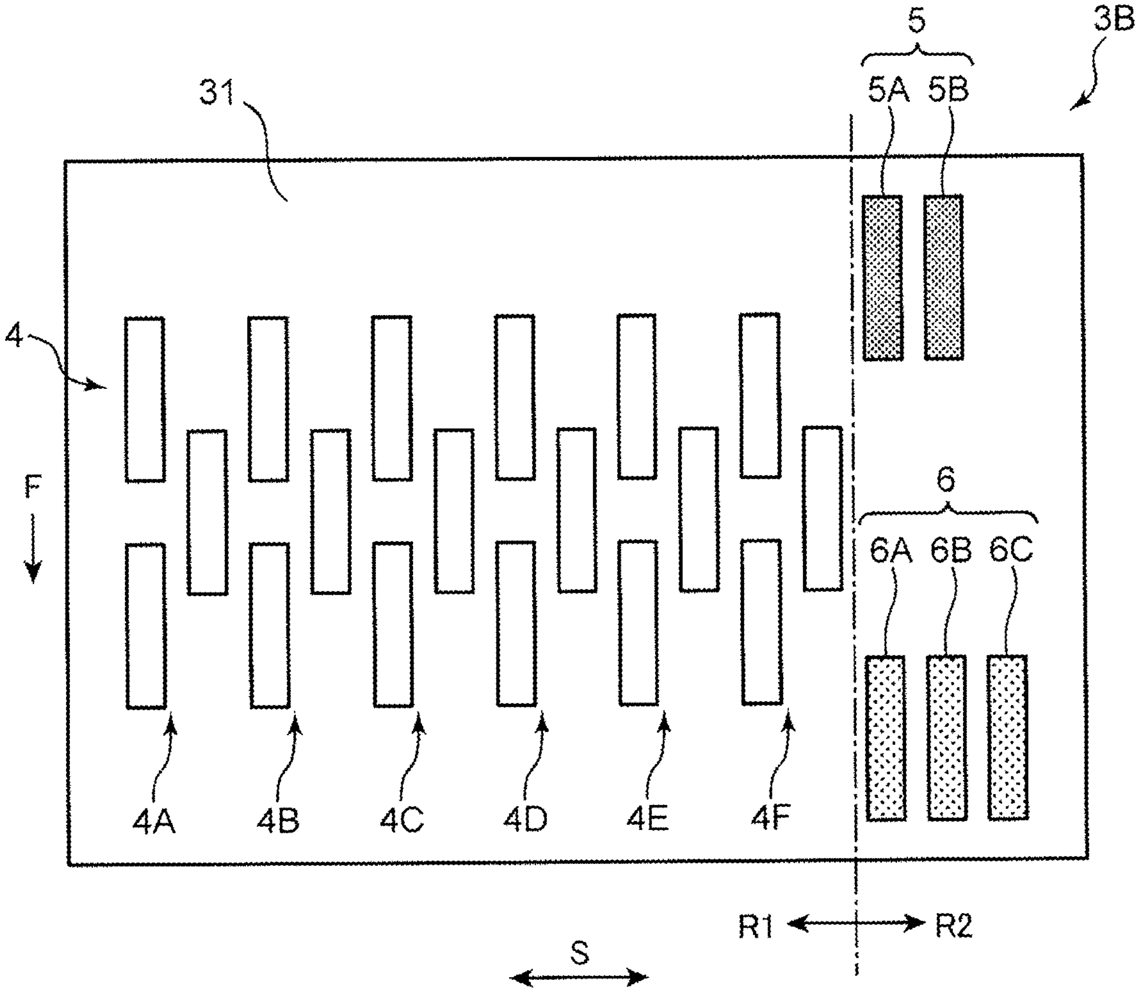
FIG. 8 is a plan view of a carriage showing head arrangement according to Example 3.

FIG. 8 is a plan view schematically showing a carriage 3B having head arrangement according to Example 3. Example 3 shows an example in which the ink head 4 that ejects ink, and the preprocessing head 5 and the postprocessing head 6 that eject a non-coloring processing solution are separately arranged in the main scanning direction.

On the head support frame 31 of the carriage 3B, the first to sixth ink heads 4A to 4F that respectively eject inks of six different colors, the preprocessing head 5, and the postprocessing head 6 are mounted. The first to sixth ink heads 4A to 4F each include the unit heads arranged in three lines similarly to Example 2. The preprocessing head 5 includes the first and second preprocessing heads 5A and 5B arranged at the same position in the conveyance direction F and spaced apart side by side in the main scanning direction S. The postprocessing head 6 includes first to third postprocessing heads 6A to 6C arranged at the same position in the conveyance direction F and spaced apart side by side in the main scanning direction S. These basic configurations are the same as those of Example 2.

In Example 3, an arrangement region of the ink head 4 and arrangement regions of the preprocessing head 5 and the postprocessing head 6 are divided on the head support frame 31. A first region R1 having a relatively large area and a second region R2 having a relatively small area adjacent to the first region R1 in the main scanning direction S are set on the head support frame 31. The ink heads 4 (first to sixth ink heads 4A to 4F) are arranged in the first region R1. On the other hand, the preprocessing head 5 and the postprocessing head 6 are not arranged in the first region R1, but are arranged in the second region R2. The preprocessing head 5 is arranged upstream of the array of the ink heads 4 in the conveyance direction F, and the postprocessing head 6 is arranged downstream of the same in the second region R2.

When the ink comes into contact with the preprocessing solution or the postprocessing solution, an ink component might aggregate. In this case, if the aggregate adheres to the ink ejection nozzle of the ink head 4, an ejection failure might occur. Furthermore, in a system for collecting a waste liquid generated in the cleaning processing, the purge processing, or the like of the head, there is also a concern that the ink comes into contact with the processing solution to aggregate and clog a collection path. According to the carriage 3B of Example 3, since the processing heads 5 and 6 and the ink head 4 are separately arranged in the main scanning direction, it is possible to make the contact between the ink and the preprocessing solution or the postprocessing solution hardly occur. Accordingly, it is possible to make the problem caused by the aggregation of the ink hardly occur.

Example 4

Figure 9:
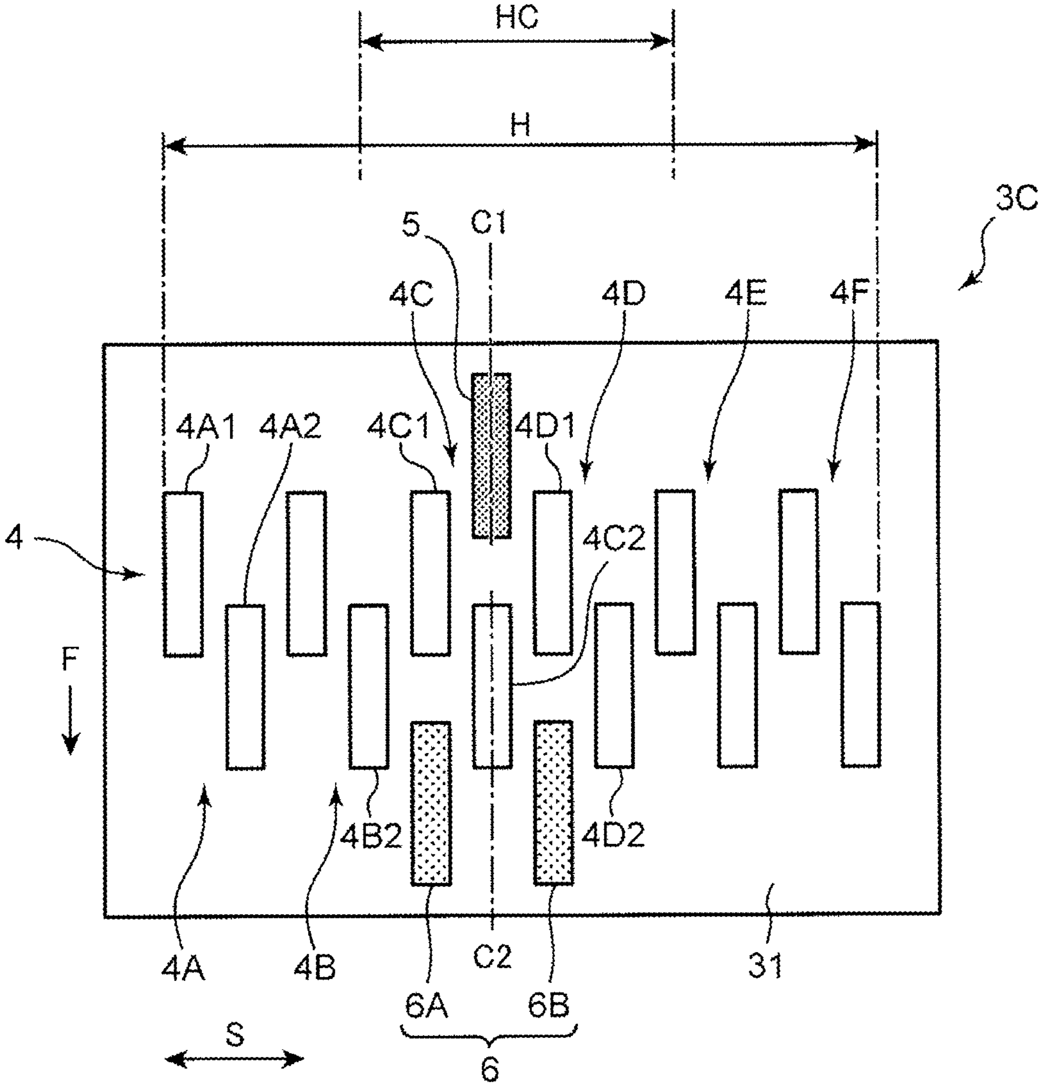
FIG. 9 is a plan view of a carriage showing head arrangement according to Example 4.

FIG. 9 is a plan view schematically showing a carriage 3C having head arrangement according to Example 4. Examples 1 to 3 show the examples where the preprocessing head 5 and the postprocessing head 6 are arranged near the end portion (near the right end) of the arrangement width H of the ink head 4 in the main scanning direction S. Example 4 shows an example in which the preprocessing head 5 and the postprocessing head 6 are arranged in a central region HC of the arrangement width H.

On the head support frame 31 of the carriage 3C, the first to sixth ink heads 4A to 4F that respectively eject inks of six different colors, the preprocessing head 5 and the postprocessing head 6 are mounted. The first to sixth ink heads 4A to 4F each include the unit heads arranged in two lines similarly to Example 1. However, a shift direction of the downstream side head of each of the ink heads 4A to 4F is reverse to that of Example 1, such as the downstream side head 4A2 is arranged on the right side of the upstream side head 4A1 in the first ink head 4A. One preprocessing head 5 and two postprocessing heads 6, the first and second postprocessing heads 6A and 6B, are provided.

The preprocessing head 5 and the postprocessing head 6 are arranged in the central region HC in the arrangement width H of the first to sixth ink heads 4A to 4F in the main scanning direction S. The present example is the same as the above Examples 1 to 3 in that the preprocessing head 5 is arranged upstream of the array of the first to sixth ink heads 4A to 4F in the conveyance direction F, and the postprocessing head 6 is arranged downstream of the same. The preprocessing head 5 is arranged at the same position as the downstream side head 4C2 of the third ink head 4C in the main scanning direction S and on the upstream side of the downstream side head in the conveyance direction F. The preprocessing head 5 is arranged so as to have a part of its downstream portion interposed between the upstream side heads 4C1 and 4D1 of the third and fourth ink heads 4C and 4D.

The first and second postprocessing heads 6A and 6B are arranged at the same position in the conveyance direction F and side by side at predetermined intervals in the main scanning direction S. The first postprocessing head 6A is arranged so as to have its upstream portion interposed between the downstream side head 4B2 of the second ink head 4B and the downstream side head 4C2 of the third ink head 4C. The second postprocessing head 6B is arranged so as to have its upstream portion interposed between the downstream side head 4C2 and the downstream side head 4D2 of the fourth ink head 4D.

The preprocessing head 5 and the postprocessing head 6 are not only arranged in the central region HC of the arrangement width H, but also arranged such that an arrangement center of the preprocessing head 5 and an array center of the first and second postprocessing heads 6A and 6B coincide with each other in the main scanning direction S. In the present example, since there is only one preprocessing head 5, the center of the preprocessing head 5 in the main scanning direction S is an arrangement center C1. The postprocessing head 6 has an intermediate point between the first postprocessing head 6A and the second postprocessing head 6B as an array center C2. The preprocessing head 5 and the postprocessing head 6 are arranged on the head support frame 31 such that the arrangement center C1 and the array center C2 are at the same position in the main scanning direction S.

As described with reference to FIG. 4, in the present embodiment, the carriage 3 repeats the forward scan and the backward scan to sequentially land the preprocessing solution, the ink, and the postprocessing solution on the workpiece W. By adopting the head arrangement of Example 4 when such two-way scanning is adopted, it is possible to reduce, at each main scanning position, variations in time from landing of the preprocessing solution on the workpiece W to landing of the ink and variations in time from landing of the ink to landing of the postprocessing solution.

In this case, the central region HC is a region located at the center of the range of the arrangement width H and having a width of half the arrangement width H or 1/3 of the same. That the processing head is arranged in the central region HC means that the array center of the processing heads is arranged in the central region HC, and half or more of the arrangement centers of the processing heads are arranged in the central region HC. Further, all the arrangement centers of the processing heads may be arranged in the central region HC.

Example 5

Figure 10:
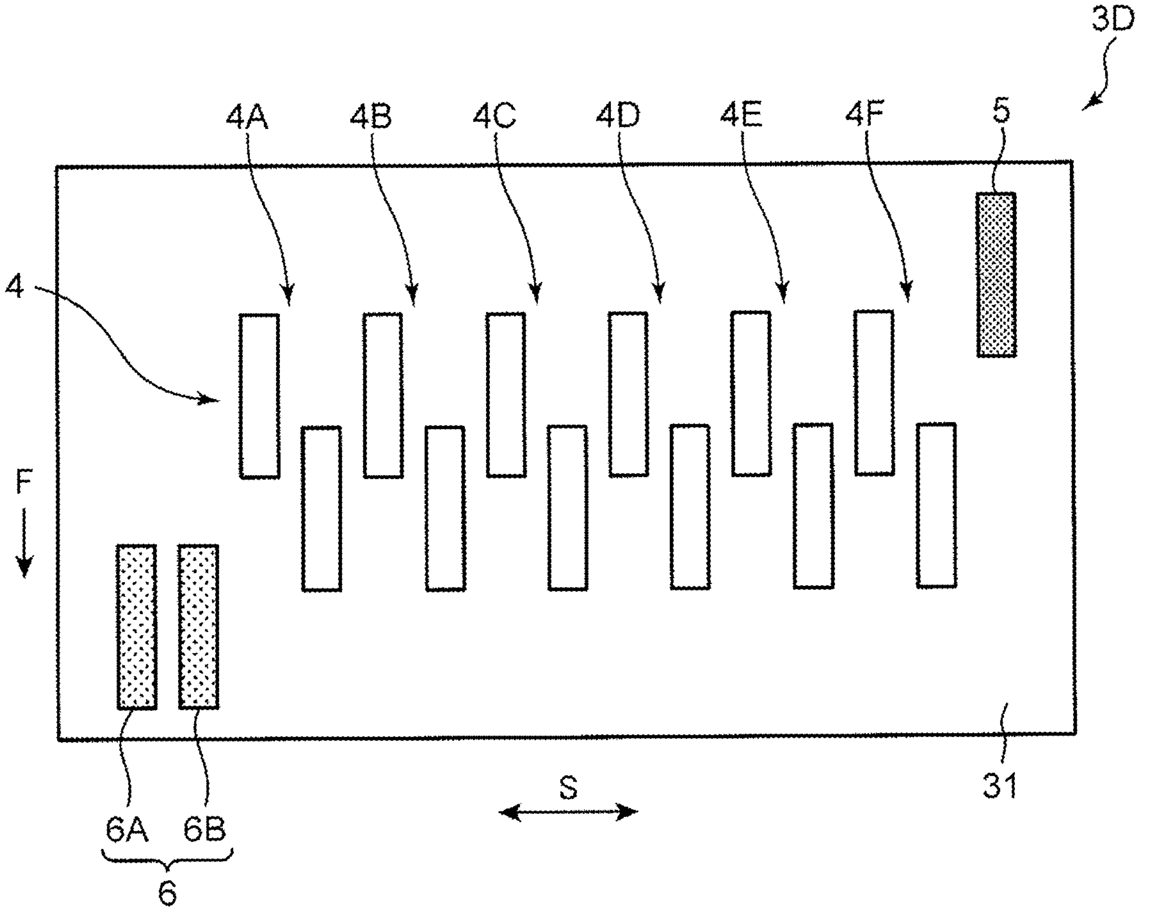
FIG. 10 is a plan view of a carriage showing head arrangement according to Example 5.

FIG. 10 is a plan view schematically showing a carriage 3D having head arrangement according to Example 5. Example 5 shows an example in which the preprocessing head 5 and the postprocessing head 6 are separately arranged on one end side and the other end side in the main scanning direction S of the head support frame 31 with the ink head 4 interposed therebetween.

On the head support frame 31, the first to sixth ink heads 4A to 4F having the same array manner as in Example 4 (FIG. 9), the preprocessing head 5, and the postprocessing head 6 are mounted. One preprocessing head 5 and two postprocessing heads 6, the first and second postprocessing heads 6A and 6B, are provided. The preprocessing head 5 is arranged on one end side (right side) of the ink head 4 in the main scanning direction S and on the upstream side in the conveyance direction F. The first and second postprocessing heads 6A and 6B are arranged on the other end side (left side) of the ink head 4 in the main scanning direction S and on the downstream side in the conveyance direction F. The first and second postprocessing heads 6A and 6B are arranged at the same position in the conveyance direction F and spaced apart side by side in the main scanning direction S.

Similarly to Example 3, the head arrangement of Example 5 is also an example in which the arrangement region of the ink head 4 and the arrangement regions of the preprocessing head 5 and the postprocessing head 6 are divided on the head support frame 31. Specifically, a right end portion of the head support frame 31 is the arrangement region of the preprocessing head 5, a left end portion of the same is the arrangement region of the postprocessing head 6, and a remaining central region is the arrangement region of the ink head 4. The head arrangement of Example 5 also enables contact of the ink with the preprocessing solution or the postprocessing solution to hardly occur.

Example 6

Figure 11:
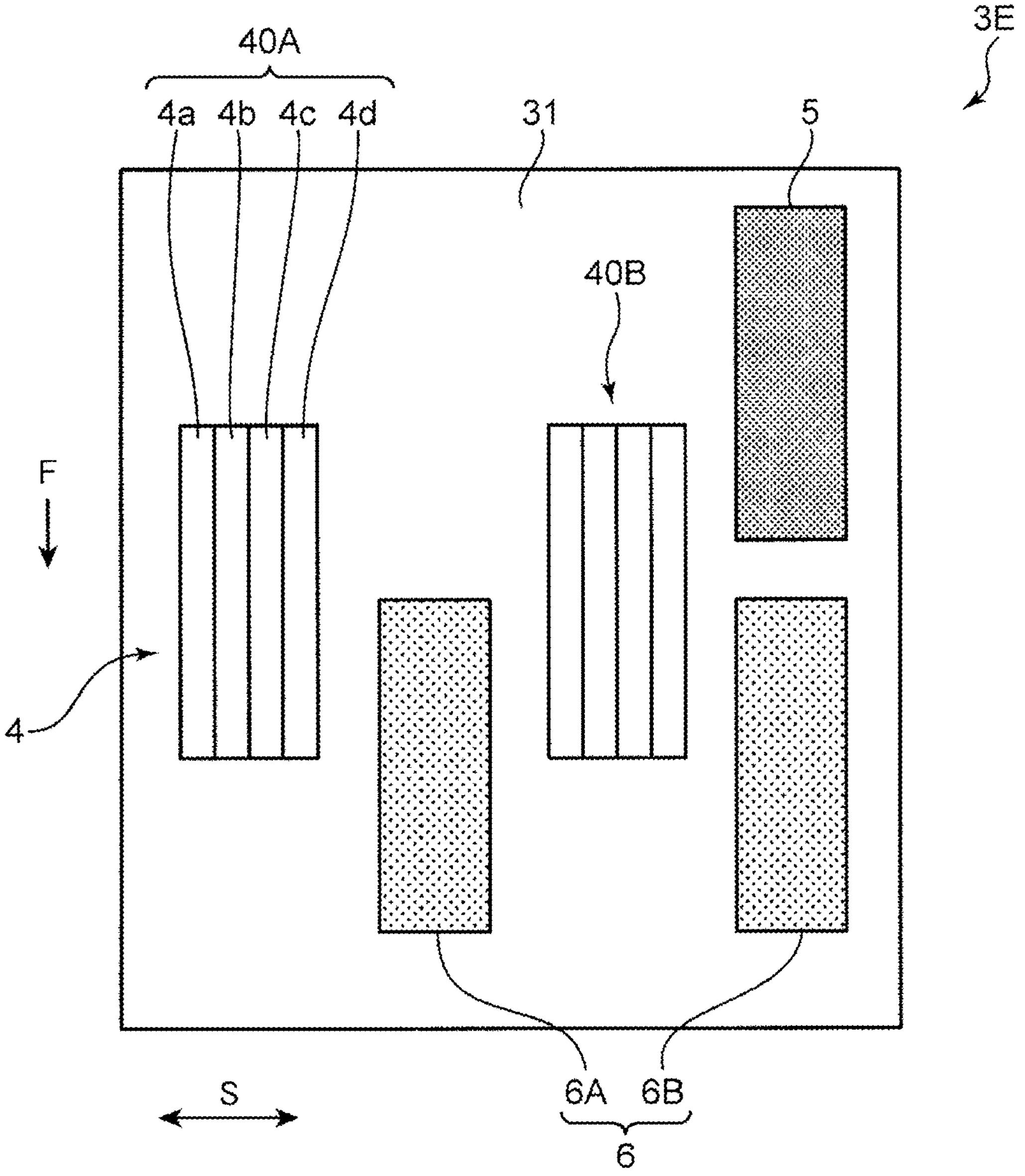
FIG. 11 is a plan view of a carriage showing head arrangement according to Example 6.

FIG. 11 is a plan view schematically showing a carriage 3E having head arrangement according to Example 6. Each of the above Examples illustrates the ink head 4 including an independent unit head for each color. Example 6 illustrates an ink head 4 including a head having ejection portions that eject inks of different colors.

On the carriage 3E, two multicolor heads 40A and 40B, one preprocessing head 5, and the postprocessing head 6 including the first and second postprocessing heads 6A and 6B are mounted. The multicolor heads 40A and 40B each include first, second, third, and fourth ink ejection regions 4*a*, 4*b*, 4*c*, and 4*d* that respectively eject inks of four different colors. The first to fourth ink ejection regions 4*a* to 4*d* may be formed by combining unit nozzles that eject ink of each color, or may be formed as ejection regions of inks of the respective colors by dividing a large number of ink ejection nozzles provided in one ink head into vertical divisions.

The preprocessing head 5 is arranged on the right side of an array of the multicolor heads 40A and 40B and on the upstream side in the conveyance direction F. The postprocessing head 6 is arranged on the downstream side in the conveyance direction F of the array. The first and second postprocessing heads 6A and 6B are arranged at the same position in the conveyance direction F and side by side at predetermined intervals in the main scanning direction S. Among these heads 6A, 6B, the first postprocessing head 6A is arranged so as to have its upstream portion interposed between the pair of multicolor heads 40A and 40B. The head arrangement according to Example 6 described above also enables necessary ejection amounts of ink and a processing solution to be secured while reducing the size of the carriage 3E.

Example 7

Figure 12:
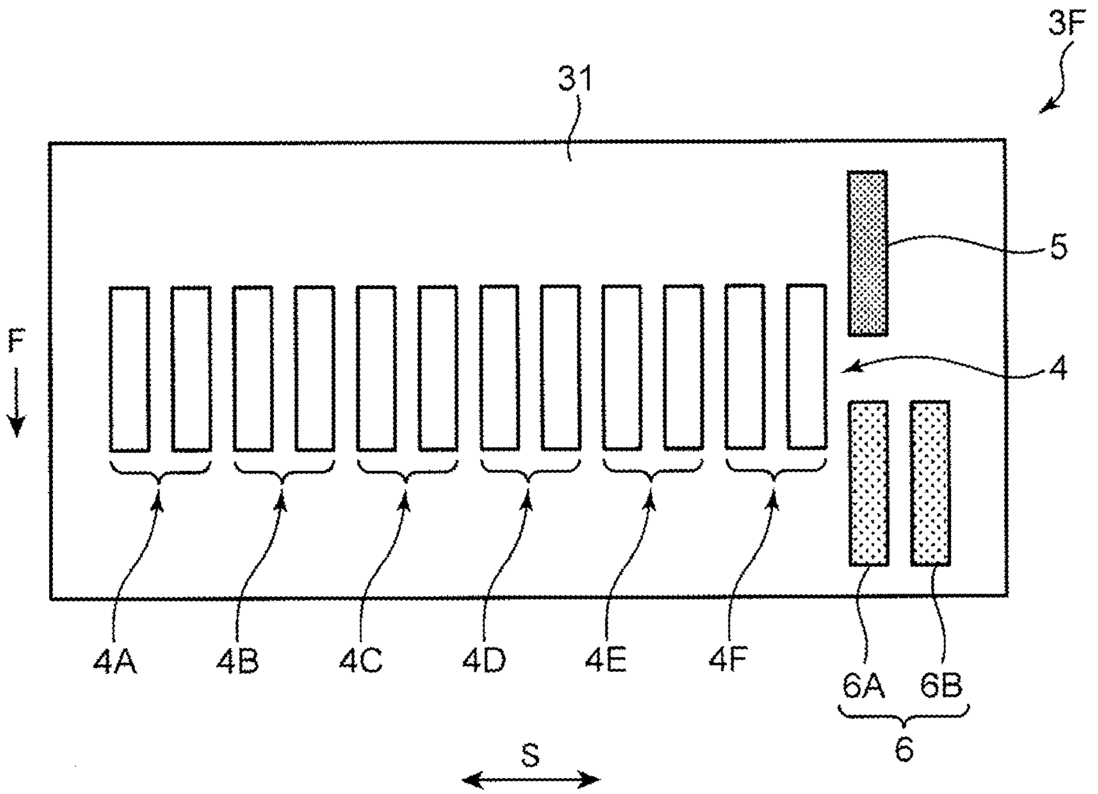
FIG. 12 is a plan view of a carriage showing head arrangement according to Example 7.

FIG. 12 is a plan view schematically showing a carriage 3F having head arrangement according to Example 7. Example 7 illustrates the ink head 4 in which the first to sixth ink heads 4A to 4F that respectively eject inks of six different colors are aligned in a row in the main scanning direction S.

On the head support frame 31 of the carriage 3F, the first to sixth ink heads 4A to 4F each including two unit heads, the preprocessing head 5, and the postprocessing head 6 are mounted. One preprocessing head 5 and two postprocessing heads 6, the first and second postprocessing heads 6A and 6B, are provided. The difference from Examples 1 to 5 described above is that the first to sixth ink heads 4A to 4F each including two unit heads are arrayed in the main scanning direction S at the same position in the conveyance direction F. The preprocessing head 5 and the postprocessing head 6 are arranged on the upstream side and the downstream side, respectively, on the right of the array of the first to sixth ink heads 4A to 4F.

Since in the head arrangement of Example 7, the width in the main scanning direction S can be made relatively large, it is suitable when a width in the conveyance direction F should be shortened. In addition, it is possible to secure necessary ejection amounts of ink and a processing solution. Further, since the arrangement region of the ink head 4 and the arrangement regions of the preprocessing head 5 and the postprocessing head 6 are divided on the head support frame 31, it is possible to make contact of the ink with the preprocessing solution or the postprocessing solution hardly occur.

Example 8

Example 8, and Example 9 to follow illustrate head arrangement in which a measure against heat generation of the processing heads 5 and 6 is taken. Generally, a head that ejects liquid by a jet method generates heat to pressurize the liquid using electricity. The ink head 4 performs ejection operation only at the time of forming a necessary color dot. By contrast, the preprocessing head 5 and the postprocessing head 6 require ejection operation of the preprocessing solution and the postprocessing solution corresponding to dots of all colors. Accordingly, the preprocessing head 5 and the postprocessing head 6 are liable to have higher temperatures than the ink heads 4. Therefore, it is desirable to conduct head arrangement assuming that the preprocessing head 5 and the postprocessing head 6 will have high temperatures.

Figure 13:
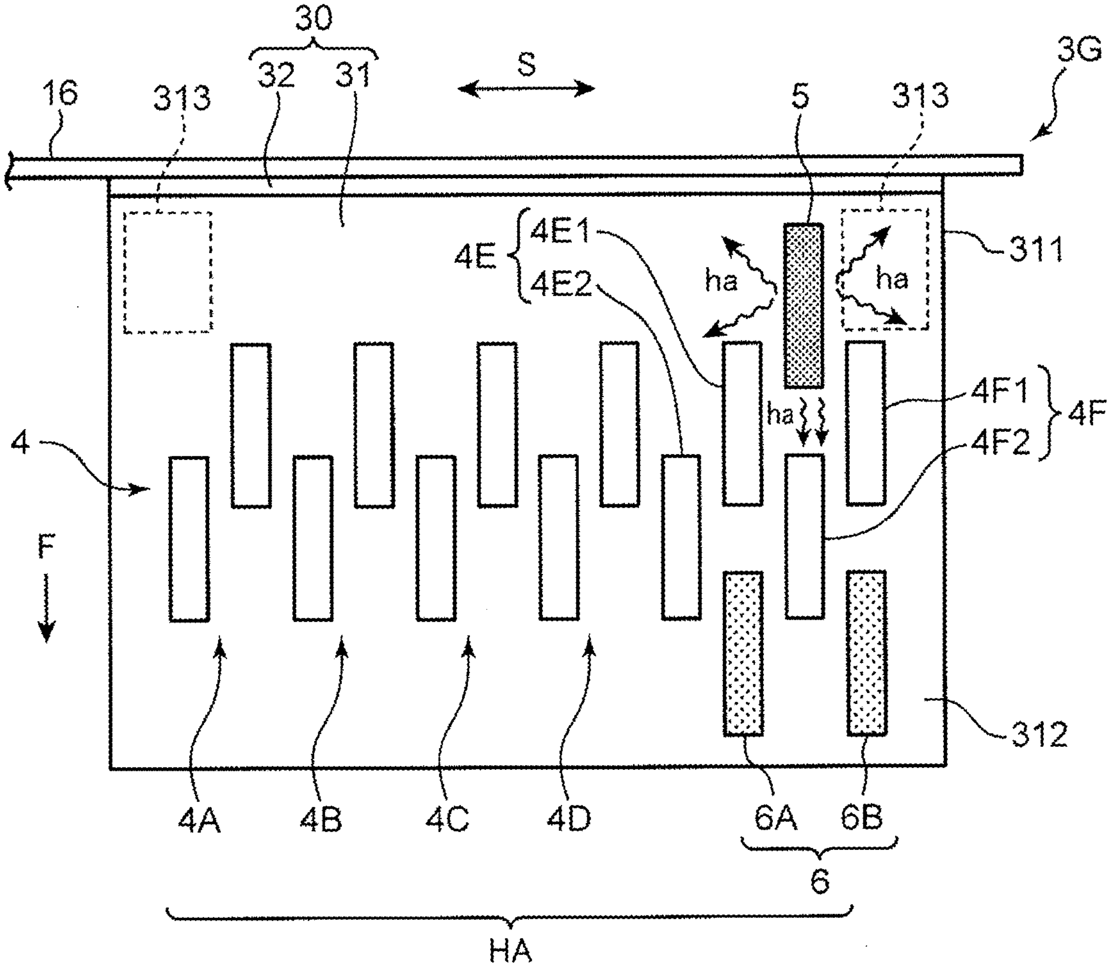
FIG. 13 is a plan view of a carriage showing head arrangement according to Example 8.

FIG. 13 is a plan view schematically showing a carriage 3G having head arrangement according to Example 8. In the carriage 3G, the back frame 32 (engagement portion) is held by the guide rail 17 (holding member) in the cantilevered state. On the head support frame 31, the ink head 4 including the first to sixth ink heads 4A to 4F, one preprocessing head 5, and the postprocessing head 6 including the first and second postprocessing heads 6A and 6B are mounted. Since the head arrangement is the same as that of Example 1 shown in FIG. 6, description thereof is omitted here.

In the present example, the preprocessing head 5 is configured with one unit head, and the postprocessing head 6 is configured with two unit heads (the first and second postprocessing heads 6A and 6B). Among the preprocessing head 5 and the postprocessing head 6, the preprocessing head 5 having a small number of unit heads is arranged on the proximal end side 311 of the head support frame 31. The postprocessing head 6 having a large number of unit heads is arranged on the distal end side 312. In other words, an upstream side end edge of the head support frame 31 in the conveyance direction F is the side held by the guide rail 17.

As described above, the processing heads 5 and 6 generate heat by the ejection operation. As schematically illustrated in FIG. 13, the preprocessing head 5 heated to a high temperature dissipates heat ha. The same applies to the first and second postprocessing heads 6A and 6B. The head support frame 31 of the carriage 3G is heated by the heat ha, so that thermal deformation may be caused on the head support frame 31, the back frame 32 which is a holding structure of the head support frame, a fixing metal for fixing the back frame 32 and the timing belt 16, and the like. This thermal deformation may affect landing accuracy of ink ejected from the ink head 4 in the carriage 3G held in the cantilevered state.

However, in the carriage 3G of Example 8, the preprocessing head 5 having a small number of unit heads is arranged on the proximal end side 311, which is the side on which the head support frame 31 is cantilevered. As a result, it is possible to reduce effects (decrease in landing accuracy) caused by thermal deformation. If the postprocessing head 6 having a large number of unit heads is arranged on the proximal end side 311, the back frame 32 receives heat ha dissipated from the two unit heads, and is more likely to be heated and thermally deformed.

Furthermore, in the carriage 3G of Example 8, the preprocessing head 5 is arranged at a position excluding the end in the main scanning direction S of an array HA of the ink head 4 and the processing heads 5 and 6. Among the heads 4, 5, and 6 mounted on the carriage 3G, the preprocessing head 5 is a head arranged on a side closest to the back frame 32 (engagement portion). Such preprocessing head 5 is arranged at a position excluding an arrangement end 313 which is an end of the head array HA.

The carriage 3G does not easily allow up-sizing. In a case where the head is arranged at the arrangement end 313 of the head array in the main scanning direction S, the head is a head closest to a corner of the carriage 3G (head support frame 31) in the main scanning direction S. Since the arrangement end 313 is also in the vicinity of the cantilevered back frame 32, thermal deformation occurring in the vicinity thereof can invite distortion or positional deviation in a height direction or a horizontal direction of the head support frame 31. This lowers accuracy of a landing position of the heads 4, 5, and 6 mounted on the carriage 3G. Therefore, by not arranging the preprocessing head 5 that will have a high temperature in a region of the arrangement end 313, it is possible to make the above-described problem of thermal deformation hardly occur.

The present embodiment has staggered arrangement in which among the two lines of the ink heads 4, the line of the heads 4 arranged on the engagement portion side is at a position shifted to the right side in FIG. 13. Further, the preprocessing head 5, which is a processing head with a small number of heads, is arranged on the engagement portion side, and the preprocessing head 5 is arranged on the rightmost side among the positions in the staggered arrangement. With such arrangement, the heads can be arranged such that no processing head is arranged at the arrangement end 313.

A preferable arrangement example of the ink heads will be described with reference to the head arrangement of the carriage 3G illustrated in FIG. 13. In the carriage 3G, the preprocessing head 5 that will have a high temperature is arranged so as to have a part thereof adjacent to the ink head 4. Specifically, the preprocessing head 5 is adjacent to the upstream side heads 4E1 and 4F1 of the fifth and sixth ink heads 4E and 4F in the main scanning direction S, and is adjacent to the downstream side head 4F2 of the sixth ink head 4F in the conveyance direction F. In addition, the first postprocessing head 6A is adjacent to the downstream side heads 4E2 and 4F2 of the fifth and sixth ink heads 4E and 4F in the main scanning direction S, and is adjacent to the upstream side head 4E1 in the conveyance direction F. The second postprocessing head 6B is adjacent to the upstream side head 4F1 and the downstream side head 4F2. On the other hand, the preprocessing head 5 and the postprocessing head 6 are not adjacent to the first to fourth ink heads 4A to 4D.

In the above head arrangement, for example, the fifth and sixth ink heads 4E and 4F (the first ink heads that eject the first color ink) that eject blue and black inks, respectively, has a larger number of unit heads adjacent to the preprocessing head 5 and the postprocessing head 6 than the first to fourth ink heads 4A to 4D (the second ink heads that eject the second color ink) that eject orange, green, yellow, and red inks, respectively. In other words, the fifth and sixth ink heads 4E and 4F are ink heads that are likely to have a higher temperature than the other ink heads 4A to 4D.

When viscosity of the ink greatly changes with a temperature change, characteristics of ink ejection (ejection amount and the like) from the ink head also change. Viscosity change characteristics due to temperature vary with a type of ink. Therefore, in the case of the present example, as the ink to be ejected from the fifth and sixth ink heads 4E and 4F that are likely to have a high temperature, ink is selected that has a smaller viscosity change due to temperature than the ink to be ejected from the first to fourth ink heads 4A to 4D. As a result, even if the fifth and sixth ink heads 4E and 4F are heated by the preprocessing head 5 and the postprocessing head 6, a change of the ejection amount and the ejection speed of the ink ejected from these ink heads 4E and 4F with the temperature can be reduced.

In this case, for each ink, the number of the unit heads of the processing heads adjacent to the ink head 4 may be evaluated as the largest number of the unit heads of the processing heads adjacent to the ink heads 4 that eject a certain ink. With respect to the first to fourth ink heads 4A to 4D, the maximum number of unit heads of adjacent processing heads is zero. With respect to the fifth ink head 4E, the maximum number of unit heads of adjacent processing heads is two. With respect to the sixth ink head 4F, the maximum number of unit heads of adjacent processing heads is three.

Furthermore, for each ink, the number of unit heads of the processing heads adjacent to the ink head 4 may be evaluated as an average of the number of unit heads of the processing heads adjacent to the ink heads 4 that eject a certain ink. With respect to the first to fourth ink heads 4A to 4D, an average number of unit heads of adjacent processing heads is zero. With respect to the fifth ink head 4E, the average number of unit heads of adjacent processing heads is 1.5. With respect to the sixth ink head 4F, the average number of unit heads of adjacent processing heads is 2.5.

As evaluation obtained by combining these, for example, the maximum number of unit heads of the adjacent processing heads may be evaluated first, and with respect to ink having no difference in the evaluation, an average of the number of unit heads of the adjacent processing heads may be evaluated. Furthermore, the order in which the ink head 4 that ejects each ink is likely to have a high temperature may be evaluated, so that ink with less change in viscosity with temperature may be ejected in the order of a likelihood of having a high temperature.

Example 9

Example 9 illustrates Example in consideration of measures against rise of the temperature of the preprocessing head 5 and the postprocessing head 6 among a plurality of same color ink heads that eject ink of the same color. The above Examples show the examples in which each of the first to sixth ink heads 4A to 4F of the respective colors includes two or three unit heads. When a difference in the number of the unit heads adjacent to the preprocessing head 5 or the postprocessing head 6 is large, there occurs a problem that the ejection characteristics of the ink greatly differ between the unit heads. The present example shows a head arrangement example in which a difference in the number of adjacent unit heads is reduced.

Figure 14A:
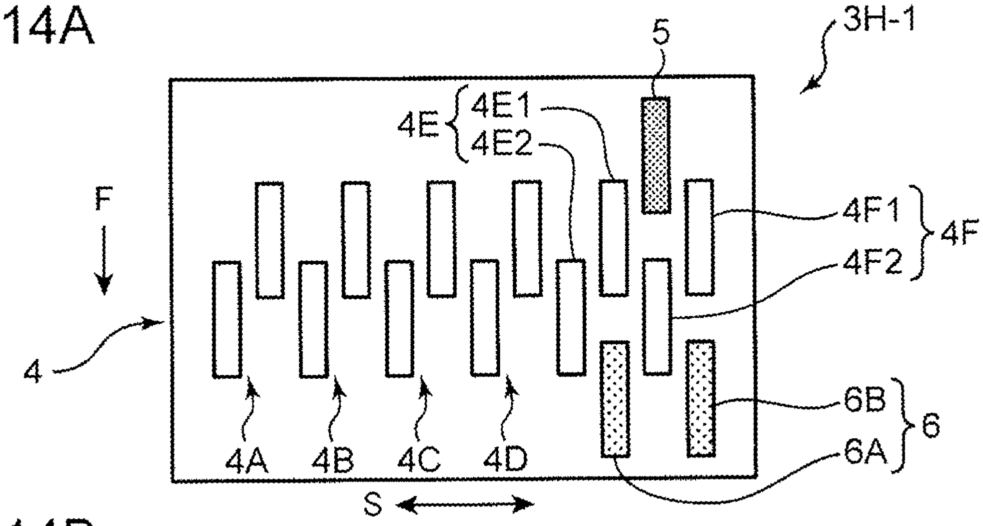
FIG. 14A is a plan view of a carriage showing head arrangement according to Example 9.

FIG. 14A is a plan view schematically showing a carriage 3H-1 having head arrangement according to Example 9. The carriage 3H-1 has head arrangement in which a difference between a maximum value and a minimum value of the count number is one or less, the count number being the number of the preprocessing head 5 or the postprocessing head 6 adjacent to each of the two unit heads (same color ink heads) of the first to sixth ink heads 4A to 4F in the main scanning direction S and the conveyance direction F.

The head arrangement of the carriage 3H-1 is the same as the head arrangement of the carriage 3G illustrated in FIG. 13. Focusing on the fifth ink head 4E, as described above, when the number of the processing heads 5 and 6 adjacent to the upstream side head 4E1 in the main scanning direction S and the conveyance direction F is counted, the count value is two (maximum values), the preprocessing head 5 and the first postprocessing head 6A. On the other hand, only one (minimum value) first postprocessing head 6A is adjacent to the downstream side head 4E2. Accordingly, the difference between the maximum value and the minimum value of the count number is one, which satisfies the above requirement.

Similarly, focusing on the sixth ink head 4F, the count number of the processing heads 5 and 6 adjacent to the upstream side head 4F1 is two (minimum value), the count number for the downstream side head 4F2 is three (maximum value), and the difference between them is one. On the other hand, for the first to fourth ink heads 4A to 4D, since there are no adjacent processing heads 5 and 6, the count number is "zero" for all the ink heads. Accordingly, all the differences between the maximum value and the minimum value are "zero", which satisfies the above requirement.

Figure 14B:
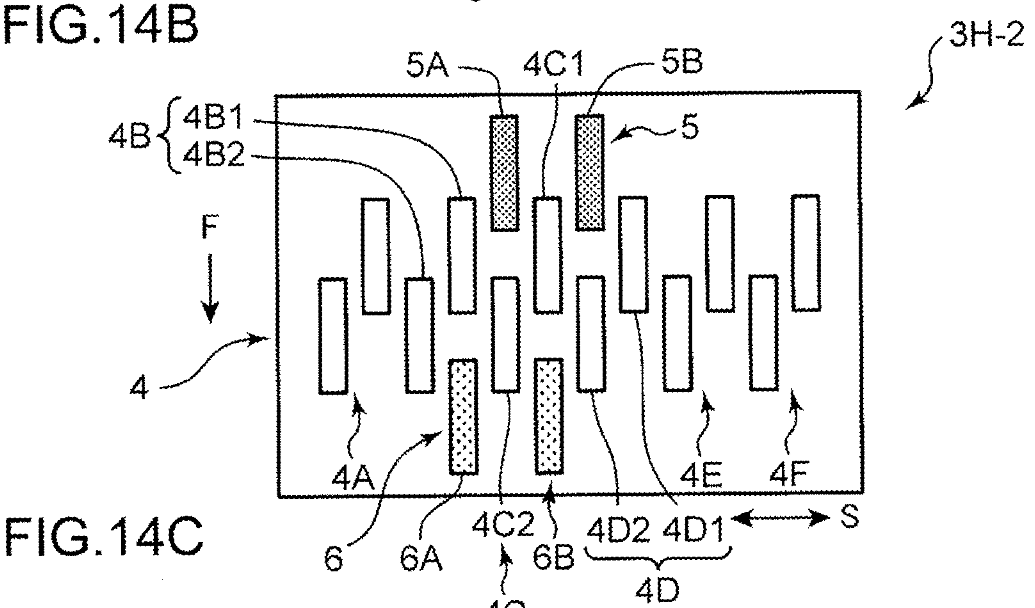
FIG. 14B is a plan view of the carriage showing head arrangement according to Example 9.

FIG. 14B is a plan view schematically showing a carriage 3H-2 having head arrangement according to another example of Example 9. The arrangement of the first to sixth ink heads 4A to 4F in the carriage 3H-2 is the same as that in FIG. 14A. The preprocessing head 5 includes the first and second preprocessing heads 5A and 5B arranged side by side in the main scanning direction S with the upstream side head 4C1 of the third ink head 4C interposed therebetween. The postprocessing head 6 includes the first and second post-processing heads 6A and 6B arranged side by side in the main scanning direction S with the downstream side head 4C2 interposed therebetween.

For the second ink head 4B of the carriage 3H-2, the count numbers of the processing heads 5 and 6 adjacent to the upstream side head 4B1 and the downstream side head 4B2, respectively, are two and one, and the difference is "one". For the third ink head 4C, the count number for each of the upstream side head 4C1 and the downstream side head 4C2 is three, and the difference is "zero". For the fourth ink head 4D, the count number for the upstream side head 4D1 is one, the count number for the downstream side head 4D2 is two, and the difference is one. The remaining ink heads 4A, 4E, and 4D have the count number of "zero". Accordingly, the difference between the maximum value and the minimum value for all of the first to sixth ink heads 4A to 4F is one or less, which satisfies the above requirement.

As described above, in Example 9, a difference between the maximum value and the minimum value of the count number is set to be one or less, the count number being the number of the processing heads 5 and 6 adjacent to each of the upstream side heads 4A1 to 4F1 and the downstream side heads 4A2 to 4F2 of the first to sixth ink heads 4A to 4F. This prevents the plurality of same color ink heads from having a large difference in the ink ejection amount.

Figure 14C:
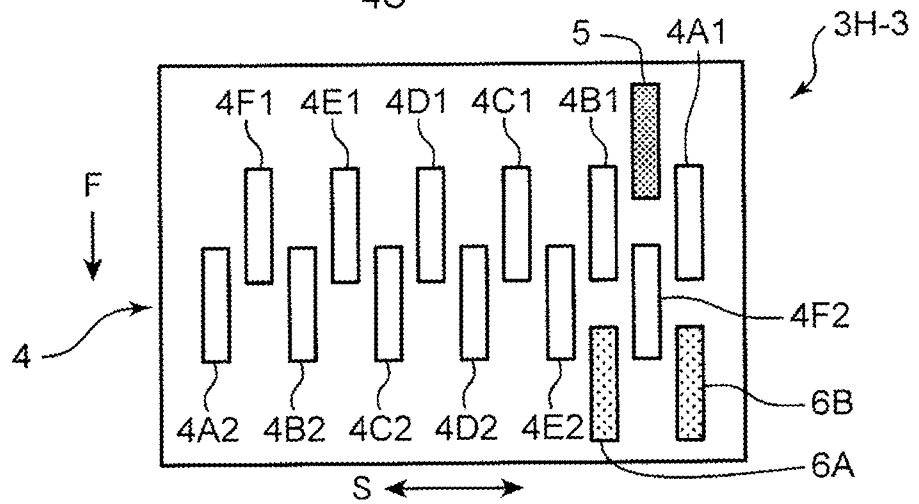
FIG. 14C is a plan view illustrating Comparative Example with respect to Example 9.

FIG. 14C is a plan view schematically showing a carriage 3H-3 having head arrangement according to Comparative Example (within the scope of the present disclosure) with respect to Example 9. Although the carriage 3H-3 includes the first to sixth ink heads 4A to 4F, it is different from the carriages 3H-1 and 3H-2 described above in that the upstream side heads 4A1 to 4F1 are arrayed in this order from left to right, and the downstream side heads 4A2 to 4F2 are arrayed in reverse. Arrangement positions of the preprocessing head 5 and the first and second postprocessing heads 6A and 6B are the same as those of the carriage 3H-1.

In the carriage 3H-3, focusing on the first ink head 4A, the count number of the processing heads 5 and 6 adjacent to the upstream side head 4A1 is two (maximum value), while the count number for the downstream side head 4A2 is zero (minimum value), and the difference between them is two. In this case, a temperature difference between the upstream side head 4A1 and the downstream side head 4A2 during the operation of the inkjet printer 1 becomes large, and a large difference could be made in the ink ejection amount between these heads. This is not preferable because even though the ink is ejected from the same color head, i.e., the first ink head 4A, coloring might differ.

Example 10

Figure 15A:
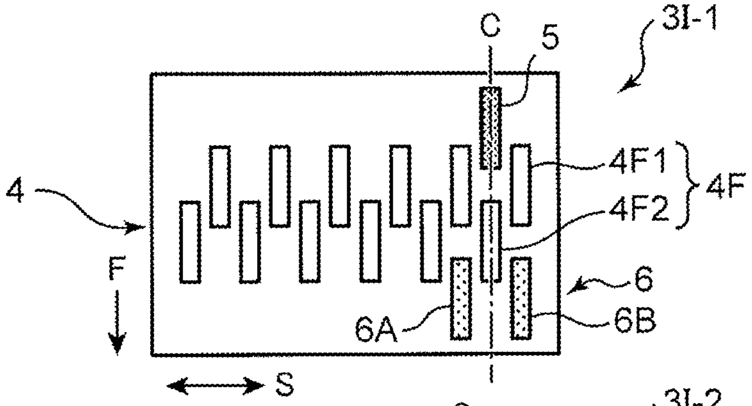
FIG. 15A is a plan view of a carriage showing head arrangement according to Example 10.
Figure 15B:
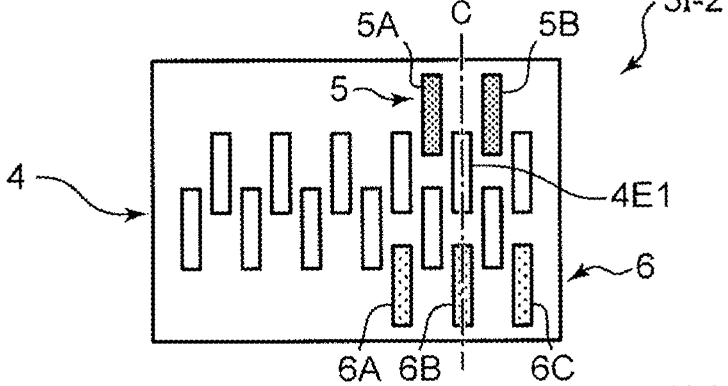
FIG. 15B is a plan view of the carriage showing head arrangement according to Example 10.
Figure 15C:
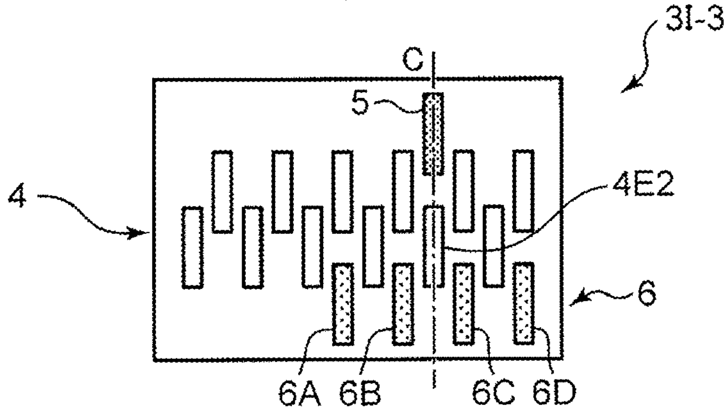
FIG. 15C is a plan view of the carriage showing head arrangement according to Example 10.

FIGS. 15A to 15C are plan views schematically showing carriages 3I-1, 3I-2, and 3I-3 having head arrangement according to Example 10. Example 10 shows an example in which contact of the preprocessing solution and the postprocessing solution with the ink can be reduced by arranging the preprocessing head 5 and the postprocessing head 6 in a cluster shape as much as possible on the head support frame 31 instead of dispersedly arranging the same.

Example 10 illustrates head arrangement that satisfies the following requirements (A) to (C).

(A) In the preprocessing head 5 and the postprocessing head 6, when a larger number of the unit heads is denoted as m and a smaller number of the unit heads is denoted as n, a requirement, m=n+odd number, is satisfied, (B) the arrangement or array center of one or a plurality of the preprocessing heads 5 in the main scanning direction S coincides with the arrangement or array center of one or a plurality of the postprocessing heads 6 in the main scanning direction S, and (C) the arrangement or array center of the preprocessing head 5 and the postprocessing head 6 coincides with the arrangement position of one of the ink heads 4 in the main scanning direction S.

Furthermore, the head arrangement of Example 10 satisfies the following requirement (D).

(D) The arrangement or array center of the preprocessing head 5 and the postprocessing head 6 coincides, in the main scanning direction S, with an arrangement position of an ink head row in the m-th row from the end in the main scanning direction S.

Here, the row is a unit of a cluster of the heads arranged along the conveyance direction F. The ink head row in the m-th row from the end in the main scanning direction S represents the row of the ink head 4 in the m-th row from the end of the head arrangement in the head arrangement of the ink heads 4. Further satisfying the requirement (D) enables the preprocessing head 5 and the postprocessing head 6 to be arranged in a cluster close to the end of the ink head 4 in the main scanning direction S. Accordingly, it is possible to reduce the possibility of contact of the preprocessing solution and the postprocessing solution with the ink on the carriage.

The carriage 3I-1 illustrated in FIG. 15A includes the ink head 4, one preprocessing head 5, and the postprocessing head 6 having the first and second postprocessing heads 6A and 6B. The head arrangement is the same as in FIG. 13 and the others. In this example, m=2 for the postprocessing heads 6 and n=1 for the preprocessing head 5. Therefore, the requirement (A), m=n+odd number, is satisfied. The arrangement center of the preprocessing head 5 and the array center of the postprocessing head 6 are both at a center C in the drawing, which also satisfies the requirement (B). Furthermore, the center C and the arrangement position of the downstream side head 4F2 of the sixth ink head 4F coincide with each other, which also satisfies the requirement (C). Furthermore, the downstream side head 4F2 is a head of the ink head row that is the second row from the right end, which also satisfies the requirement (D).

The carriage 3I-2 illustrated in FIG. 15B includes the ink head 4, the preprocessing head 5 having the first and second preprocessing heads 5A and 5B, and the postprocessing head 6 having the first, second, and third postprocessing heads 6A, 6B, and 6C. In this example, m=3 for the postprocessing head 6 and n=2 for the preprocessing head 5. Therefore, the requirement (A), m=n+odd number, is satisfied. The array center of the preprocessing head 5 and the array center of the postprocessing head 6 are both at the center C in the drawing, which also satisfies the requirement (B). Furthermore, the center C and the arrangement position of the upstream side head 4E1 of the fifth ink head 4E coincide with each other, which also satisfies the requirement (C). Furthermore, the upstream side head 4E1 is a head of the ink head row in the third row from the right end, and also satisfies the requirement (D).

The carriage 3I-3 illustrated in FIG. 15C includes the ink head 4, one preprocessing head 5, and the postprocessing head 6 having first, second, third, and fourth postprocessing heads 6A, 6B, 6C, and 6D. In this example, m=4 for the postprocessing heads 6 and n=1 for the preprocessing head 5. Therefore, the requirement (A), m=n+odd number, is satisfied. The arrangement center of the preprocessing head 5 and the array center of the postprocessing head 6 are both at a center C in the drawing, which also satisfies the requirement (B). Furthermore, the center C and an arrangement position of the downstream side head 4E2 of the fifth ink head 4E coincide with each other, which also satisfies the requirement (C). Furthermore, the downstream side head 4E2 is a head of the ink head row which is the fourth row from the right end, and also satisfies the requirement (D).

Figure 15D:
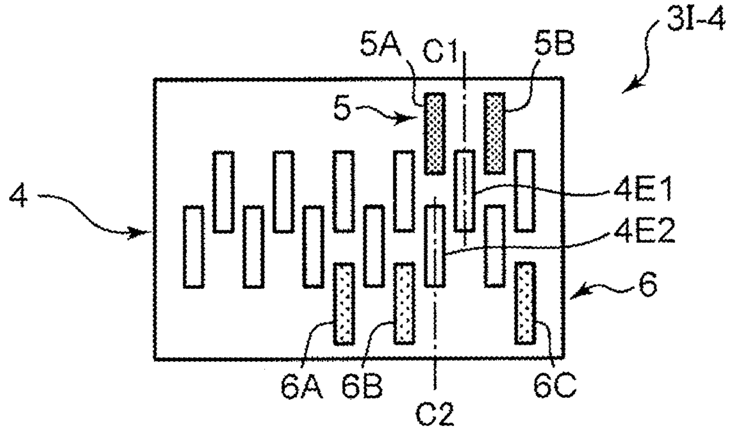
FIG. 15D is a plan view illustrating Comparative Example with respect to Example 10.

FIG. 15D is a plan view schematically showing a carriage 3I-4 having head arrangement according to Comparative Example (within the scope of the present disclosure) with respect to Example 10. The carriage 3I-4 includes the ink head 4, the preprocessing head 5 having the first and second preprocessing heads 5A and 5B, and the postprocessing head 6 having the first, second, and third postprocessing heads 6A, 6B, and 6C. This Comparative Example satisfies the requirement (A), m=n+odd number. However, the array center C1 of the preprocessing head 5 and the array center C2 of the postprocessing head 6 are at positions deviated from each other in the main scanning direction S, which does not satisfy the requirement (B). As a result, the requirement (C) is not satisfied either.

According to the head arrangement of Example 10, the preprocessing head 5 and the postprocessing head 6 can be mounted on the carriages 3I-1 to 3I-3 in a cluster to some extent. Thus, among the first to sixth ink heads 4A to 4F, the number of ink heads arranged at positions close to the preprocessing head 5 or the postprocessing head 6 can be reduced. Therefore, it is possible to reduce the possibility of contact of the preprocessing solution and the postprocessing solution with the ink on the carriage.

For example, the carriage 3I-2 having the same number of m and n is compared with the carriage 3I-4 according to Comparative Example. In Comparative Example, the first and second postprocessing heads 6A and 6B are shifted in the main scanning direction S by one pitch as compared with Example. Thus, in Comparative Example, the number of unit heads of the ink head 4 adjacent to the first to third postprocessing heads 6A to 6C is increased. Therefore, the possibility that the ink and the postprocessing solution come into contact with each other becomes higher than in Example, which is not preferable.

Example 11

Figure 16:
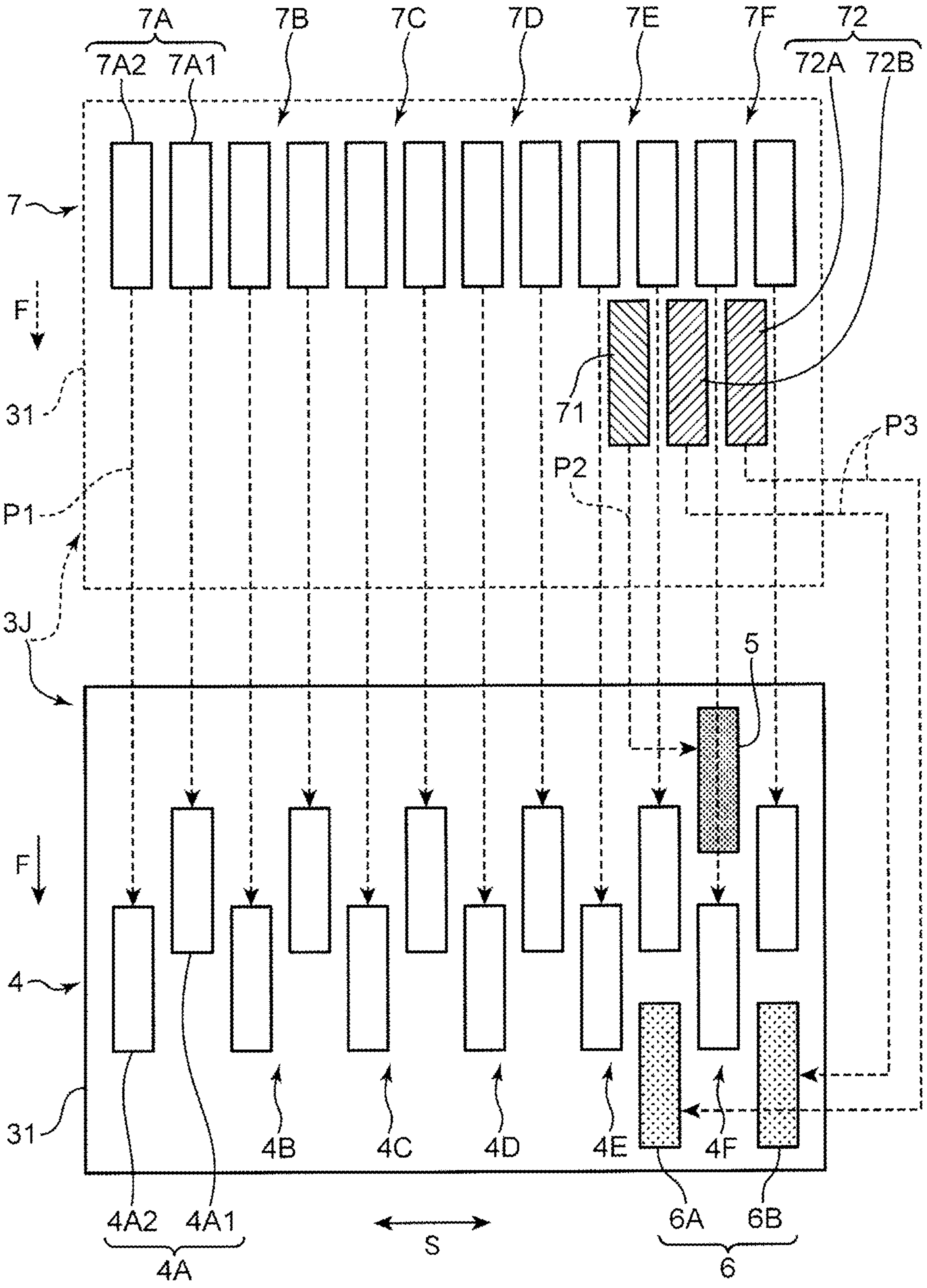
FIG. 16 is a plan view of a carriage showing head arrangement and sub-tank arrangement according to Example 11.

Example 11 illustrates a preferable arrangement relationship between the heads 4, 5, and 6 on the carriage and sub-tanks that supply the ink or the processing solution to these heads. FIG. 16 is a plan view showing a carriage 3J having head arrangement and sub-tank arrangement according to Example 11. The carriage 3J includes the ink head 4 having the first to sixth ink heads 4A to 4F, one preprocessing head 5, and the postprocessing head 6 having the first and second postprocessing heads 6A and 6B. The head arrangement is the same as in FIG. 13 and the others.

The sub-tank 7 is also mounted on the carriage 3J. The sub-tank 7 includes ink sub-tanks 7A to 7F, a preprocessing solution sub-tank 71, and a postprocessing solution sub-tank 72. Ink, a preprocessing solution, and a postprocessing solution are supplied to these sub-tanks 7 from a main tank (not illustrated). The ink sub-tanks 7A to 7F supply the ink to the first to sixth ink heads 4A to 4F, respectively. For example, the first color ink is supplied from a first tank 7A1 of the ink sub-tank 7A to the upstream side head 4A1 of the first ink head 4A and from a second tank 7A2 to the downstream side head 4A2 via the pipeline P1. Similarly, the second to sixth ink heads 4B to 4F are structured to be supplied with the inks of the second to sixth colors. An arrangement order of the ink sub-tanks 7 in the main scanning direction S is the same as the arrangement order of the ink heads 4 in the main scanning direction S, the ink heads 4 receiving supply of ink from the ink sub-tanks 7.

The ink may be supplied from one ink sub-tank 7 to the plurality of ink heads 4 that eject the ink of the same color. In this case, the ink heads 4 sharing the ink sub-tank 7 may be arranged at a collective position in the main scanning direction S. Furthermore, the ink heads 4 that eject the same ink are preferably arranged in clusters in the main scanning direction S. In the main scanning direction S, an arrangement order of the ink sub-tanks 7 of the respective colors may be the same as an arrangement order of the ink heads 4 of the respective colors.

The preprocessing solution sub-tank 71 supplies the preprocessing solution to the preprocessing head 5 via the pipeline P2. The postprocessing solution sub-tank 72 includes a first tank 72A and a second tank 72B. The first and second tanks 72A and 72B respectively supply the postprocessing solution to the first and second postprocessing heads 6A and 6B via a pipeline P3.

The ink sub-tanks 7A to 7F are mounted on the carriage 3J so as to be aligned in the main scanning direction S. The processing solution sub-tanks 71 and 72 are arranged side by side in the main scanning direction S at positions different from the ink sub-tanks 7A to 7F in the conveyance direction F. Specifically, the preprocessing solution sub-tank 71 and the first and second tanks 72A and 72B of the postprocessing solution sub-tank 72 are aligned in the main scanning direction S on the downstream side in the conveyance direction F of the ink sub-tanks 7A to 7F. Only the preprocessing solution sub-tank 71 may be arranged upstream of the ink sub-tanks 7A to 7F.

Acceleration in the main scanning direction S acts on a liquid in the sub-tank 7 mounted on the carriage 3J that reciprocates in the main scanning direction S. The sub-tank 7 and the heads 4, 5, and 6 are connected by the pipelines P1, P2, and P3. However, when the sub-tanks 7 are widely distributed on the carriage 3J, an arrangement range of the pipelines P1 to P3 in the main scanning direction S is also increased. Since the pipelines P1 to P3 are also filled with the ink or the processing solution, meniscus breakdown might occur at ejection portions of the heads 4, 5, and 6 due to the influence of the acceleration.

However, according to the configuration of Example 11, the ink sub-tanks 7A to 7F are mounted on the carriage 3J so as to be aligned in the main scanning direction S similarly to the first to sixth ink heads 4A to 4F. Therefore, the ink sub-tanks 7A to 7F can be arranged in a relatively narrow range on the head support frame 31 of the carriage 3J. Similarly, the preprocessing solution sub-tank 71 and the postprocessing solution sub-tank 72 can also be arranged in a relatively narrow range on the head support frame 31 of the carriage 3J.

Further, the preprocessing solution sub-tank 71 and the postprocessing solution sub-tank 72 are arranged at positions different from the ink sub-tanks 7A to 7F in the conveyance direction F. Therefore, a difference in position in the main scanning direction S can be reduced between the preprocessing solution sub-tank 71 and the postprocessing solution sub-tank 72 and the processing head to which each of the preprocessing solution sub-tank 71 and the postprocessing solution sub-tank 72 supplies the processing solution. As a result, it is possible to reduce a distribution range in the main scanning direction S of the preprocessing solution being continuously present in the preprocessing solution sub-tank 71, the pipeline P, and the preprocessing head 5, thereby making the preprocessing solution be less susceptible to the acceleration. Similarly, it is possible to reduce a distribution range in the main scanning direction S of the postprocessing solution being continuously present, thereby making the postprocessing solution be less susceptible to the acceleration.

Similarly, the ink sub-tanks 7A to 7F and the ink heads 4 to which the ink sub-tanks 7A to 7F respectively supply ink can be arranged with a small difference in position in the main scanning direction S. This makes it possible to reduce a distribution range in the main scanning direction S of the ink continuously existing, thereby making the ink be less susceptible to the acceleration.

Conclusion of Present Disclosure

An inkjet recording device according to one aspect of the present disclosure includes: a conveyance unit that conveys a recording medium in a predetermined conveyance direction; a carriage that reciprocates in a main scanning direction intersecting the conveyance direction; a plurality of ink heads that are mounted on the carriage so as to be aligned in the main scanning direction and eject ink for image formation; and a plurality of processing heads that are mounted on the carriage and eject a non-coloring processing solution, in which the plurality of processing heads are arranged side by side in the main scanning direction at positions different from the ink heads in the conveyance direction.

According to this inkjet recording device, since the processing head is arranged at a position different from the ink head in the conveyance direction, it is possible to secure a desirable landing order of the processing solution and the ink on the recording medium in both forward movement and backward movement of the carriage. If the processing head and the ink head are arranged at the same position in the conveyance direction, the processing head needs to be arranged on both sides of an ink head group in order to secure the landing order. In this case, a width of the carriage in the main scanning direction increases. According to the configuration of the present disclosure, since such arrangement is unnecessary, the width of the carriage in the main scanning direction can be reduced. The plurality of processing heads are arranged side by side in the main scanning direction. Therefore, even when an ejection amount of the processing solution is insufficient with a single head, a necessary ejection amount can be secured by arranging the plurality of processing heads.

In the above inkjet recording device, the plurality of ink heads may be arrayed also in a direction intersecting an array direction of the plurality of processing heads.

According to this inkjet recording device, the plurality of ink heads are arrayed also in the direction intersecting the array direction (main scanning direction) of the plurality of processing heads. Therefore, even if the number of ink heads is increased in order to increase an ejection amount of ink or to achieve multicoloring, the width of the carriage in the main scanning direction can be reduced.

In the above inkjet recording device, the plurality of processing heads may be arranged in a range of an arrangement width of the plurality of ink heads in the main scanning direction.

According to this inkjet recording device, even when the processing head is mounted on the carriage, it is not necessary to extend the width of the carriage in the main scanning direction. Accordingly, the width of the carriage in the main scanning direction can be reduced.

In the above inkjet recording device, the processing heads may be arranged so as to be partially interposed between a pair of adjacent ink heads in the main scanning direction.

According to this inkjet recording device, the ink heads and the processing heads arranged at different positions in the conveyance direction (sub-scanning direction) can be arranged at high density in the conveyance direction. Accordingly, a width of the carriage in the conveyance direction can be reduced.

In the above inkjet recording device, the processing heads may be arranged so as to be partially adjacent to the ink heads in the main scanning direction and the conveyance direction, the plurality of ink heads may include a plurality of same color ink heads that eject ink of the same color, and when for each of the same color ink heads, the number of the adjacent processing heads is counted, a difference between a maximum value and a minimum value of the count numbers may be one or less.

Generally, a head that ejects liquid by a jet method generates heat to pressurize the liquid using electricity. In particular, unlike an ink head that performs ejection operation only when forming necessary color dots, a processing head that requires ejection operation corresponding to dots of all colors is likely to have a higher temperature. An ink head adjacent to such a processing head is likely to have a high temperature, and has a larger difference in an ink ejection amount than that of an ink head not adjacent to the processing head. As described above, by setting, to one or less, the difference between the maximum value and the minimum value of the count number of the processing heads adjacent to each of the same color ink heads, a large difference in the ink ejection amount hardly occurs among the plurality of same color ink heads.

In the above inkjet recording device, the processing heads may be arranged so as to be partially adjacent to the ink heads in the main scanning direction and the conveyance direction, the plurality of ink heads may include at least a first ink head that ejects ink of a first color and a second ink head that ejects ink of a second color, and when the number of the adjacent processing heads is larger for the first ink head than for the second ink head, the first ink head may eject, as the ink of the first color, ink having a smaller viscosity change due to temperature than the ink of the second color.

According to this inkjet recording device, the first ink head having a large number of adjacent processing heads ejects ink having a small viscosity change due to temperature. Accordingly, even if the first ink head is heated by the processing head, change of the ejection amount and the ejection speed of the ink of the first color due to the temperature can be reduced.

In the above inkjet recording device, the plurality of processing heads and the plurality of ink heads may be arranged to be spaced apart in the main scanning direction.

When the ink comes into contact with the processing solution, for example, an ink component might aggregate. In this case, when the aggregate adheres to an ink ejection nozzle of the ink head, an ejection failure might occur. According to the above inkjet recording device, since the processing head and the ink head are separately arranged in the main scanning direction, it is possible to make contact between the ink and the processing solution on the carriage hardly occur.

The above inkjet recording device may include a preprocessing head arranged upstream of the ink head in the conveyance direction, and a postprocessing head arranged downstream of the ink head, in which at least one of the preprocessing head and the postprocessing head may correspond to the plurality of processing heads arranged side by side in the main scanning direction.

According to this mode, it is possible to provide an all-in-one inkjet recording device in which all of ejection heads for the preprocessing solution, the ink, and the postprocessing solution are mounted on one carriage. Furthermore, since the preprocessing head, the ink head, and the postprocessing head are sequentially arranged in the conveyance direction, a desirable landing order of the preprocessing solution, the ink, and the postprocessing solution on the recording medium can be secured. Furthermore, since at least either the preprocessing heads or the postprocessing heads are arranged side by side in the main scanning direction, required ejection amounts of the preprocessing solution and the postprocessing solution can be secured.

In the above inkjet recording device, the carriage may include a first region in which the plurality of ink heads are arranged and a second region adjacent to the first region in the main scanning direction, and the preprocessing head and the postprocessing head may be arranged in the second region.

According to this inkjet recording device, the preprocessing head, the postprocessing head, and the ink head can be arranged separately in the main scanning direction. Accordingly, it is possible to make it difficult for the preprocessing solution and the postprocessing solution to contact with the ink on the carriage, thereby making problems such as aggregation hardly occur.

In the above inkjet recording device, the preprocessing head and the postprocessing head may be arranged in a central region of an arrangement width of the plurality of ink heads in the main scanning direction.

Alternatively, the preprocessing head and the postprocessing head may be arranged such that an arrangement or array center of one or a plurality of the preprocessing heads in the main scanning direction coincides with an arrangement or array center of one or a plurality of the postprocessing heads in the main scanning direction.

According to these inkjet recording devices, it is possible to reduce variations in time from landing of the preprocessing solution on the recording medium to landing of the ink and variations in time from landing of the ink to landing of the postprocessing solution at each main scanning position.

In the above inkjet recording device, in the preprocessing head and the postprocessing head, when a larger number of the heads is denoted as m and a smaller number of the heads is denoted as n, a requirement, m=n+odd number, may be satisfied, an arrangement or array center of one or a plurality of the preprocessing heads in the main scanning direction may coincide with an arrangement or array center of one or a plurality of the postprocessing heads in the main scanning direction, and an arrangement or array center of the preprocessing head and the postprocessing head may coincide with an arrangement position of one of the plurality of ink heads in the main scanning direction.

According to this inkjet recording device, the preprocessing head and the postprocessing head can be mounted on the carriages in a cluster to some extent. Thus, among the plurality of ink heads, the number of ink heads arranged at positions close to the processing head can be reduced. Accordingly, it is possible to reduce the possibility of contact of the preprocessing solution and the postprocessing solution with the ink on the carriage.

The above inkjet recording device may further include a holding member that holds the carriage in a state of being reciprocable in the main scanning direction, in which the carriage may include an engagement portion that is held by the holding member in a cantilevered state, and the preprocessing head may be arranged closer to the engagement portion than the postprocessing head in the conveyance direction.

According to this inkjet recording device, the carriage can be supported with a simple structure by causing the holding member to cantilever the carriage. In addition, cantilever support easily realizes a structure in which one side of the carriage is opened, and facilitates maintenance of the ink head and the processing head. When the carriage is cantilevered, it is assumed that the accuracy in the height direction decreases on the side of the carriage far from the engagement portion. However, since the postprocessing head having tolerance for a demand for ejection accuracy is mounted on the side far from the engagement portion, an image quality will be hardly affected greatly.

The above inkjet recording device may further include a holding member that holds the carriage in a state of being reciprocable in the main scanning direction, in which the carriage may include an engagement portion that is held by the holding member in a cantilevered state, and of the preprocessing head and the postprocessing head, the processing head having a smaller number of heads may be arranged on the engagement portion side of the carriage.

As described above, the processing head generates heat by the ejection operation. For this reason, the carriage on which the processing head is mounted is heated, which may cause thermal deformation of the carriage and a holding structure thereof. In a mode in which the carriage is cantilevered, the thermal deformation might affect ink landing accuracy. According to the above configuration, the number of the processing heads arranged on the proximal end portion side can be reduced, and the influence of thermal deformation can be reduced.

The above inkjet recording device may further include a holding member that holds the carriage in a state of being reciprocable in the main scanning direction, in which the carriage may include an engagement portion that is held by the holding member in a cantilevered state, and of the ink head and the processing head, the head arranged at a side closest to the engagement portion of the carriage may be arranged at a position excluding an end of an array of the ink heads and the processing heads in the main scanning direction.

According to this inkjet recording device, the head arranged on the side closest to the engagement portion is not arranged at the end of the array of the ink head and the processing head in the main scanning direction. Generally, an end in the main scanning direction is closest to an end portion (corner) of the carriage. When thermal deformation occurs in the vicinity of the proximal end portion which is the end portion of the carriage, positional accuracy of the head mounted on the carriage decreases. The above configuration makes such a problem hardly occur.

The above inkjet recording device may further include ink sub-tanks that supply the ink to each of the plurality of ink heads, and processing solution sub-tanks that supply the processing solution to each of the plurality of processing heads, the ink sub-tanks being mounted on the carriage so as to be aligned in the main scanning direction, and the processing solution sub-tanks being arranged side by side in the main scanning direction at positions different from the ink sub-tanks in the conveyance direction.

According to the above configuration, since the ink sub-tank and the processing head sub-tank, similarly to the head, are arranged side by side in the main scanning direction and at different positions in the conveyance direction, the sub-tanks can be arranged in a relatively narrow range on the carriage. Acceleration in the main scanning direction acts on liquid in the sub-tank mounted on the carriage that reciprocates in the main scanning direction. Although the sub-tank and the head are connected by a predetermined pipeline, since when the sub-tanks are widely distributed on the carriage, the arrangement range of the pipeline in the main scanning direction also increases, the influence of the acceleration increases, so that meniscus breakdown might occur at an ejection portion of the head. The above configuration makes it possible to relatively narrow the arrangement range of the pipeline in the main scanning direction.

According to the present disclosure described above, it is possible to provide an inkjet recording device that enables necessary ejection amounts of ink and a processing solution to be secured while reducing a size of a carriage.

REFERENCE SIGNS

1 inkjet printer (ink head type recording device)
16 timing belt (moving member)
17 guide rail (holding member)
20 workpiece conveyance unit (conveyance unit)
3, 3A to 3J carriage
31 head support frame
32 back frame (engagement portion)
4 ink head
4A to 4F first to sixth ink heads
4A1 to 4F1 upstream side head
4A2 to 4F2 downstream side head
5 preprocessing head (processing head)
6 postprocessing head (processing head)
7 sub-tank
7A to 7F ink sub-tank
71 preprocessing solution sub-tank
72 postprocessing solution sub-tank
F conveyance direction
S main scanning direction
W workpiece (recording medium)

The invention claimed is:

1. An inkjet recording device comprising:

a conveyance unit configured to convey a recording medium in a conveyance direction;

a carriage configured to reciprocate in a main scanning direction intersecting the conveyance direction;

a plurality of ink heads located on the carriage, aligned in the main scanning direction, and configured to eject ink for image formation; and a plurality of processing heads located on the carriage and configured to eject a non-coloring processing solution, wherein the plurality of processing heads includes a first processing head and a second processing head that are arranged side by side in the main scanning direction at positions different from the ink heads in the conveyance direction, the first processing head and the second processing head are arranged at an identical position in the conveyance direction, and no more than one ink head among the plurality of ink heads is located between the first processing head and the second processing head in the main scanning direction.

2. The inkjet recording device according to claim 1, wherein the plurality of ink heads are arranged also in a direction intersecting an array direction of the plurality of processing heads.

3. The inkjet recording device according to claim 1, wherein the plurality of processing heads are arranged in a range of an arrangement width of the plurality of ink heads in the main scanning direction.

4. The inkjet recording device according to claim 1, wherein the processing heads are partially adjacent to the ink heads in the main scanning direction and the conveyance direction, the plurality of ink heads include a plurality of same color ink heads that eject ink of the same color, and when for each of the same color ink heads, the number of the adjacent processing heads is counted, a difference between a maximum value and a minimum value of the count numbers is one or less.

5. The inkjet recording device according to claim 1, wherein the plurality of processing heads and the plurality of ink heads are spaced apart in the main scanning direction.

6. The inkjet recording device according to claim 1, comprising:

a preprocessing head arranged upstream of the ink head in the conveyance direction; and a postprocessing head arranged downstream of the ink head, wherein at least one of the preprocessing head and the postprocessing head corresponds to the plurality of processing heads arranged side by side in the main scanning direction.

7. The inkjet recording device according to claim 6, wherein the carriage includes a first region in which the plurality of ink heads are arranged and a second region adjacent to the first region in the main scanning direction, and the preprocessing head and the postprocessing head are arranged in the second region.

8. The inkjet recording device according to claim 6, wherein the preprocessing head and the postprocessing head are arranged in a central region of an arrangement width of the plurality of ink heads in the main scanning direction.

9. The inkjet recording device according to claim 6, wherein the preprocessing head and the postprocessing head are arranged such that an arrangement or array center of one or a plurality of the preprocessing heads in the main scanning direction coincides with an arrangement or array center of one or a plurality of the postprocessing heads in the main scanning direction.

10. The inkjet recording device according to claim 6, wherein in the preprocessing head and the postprocessing head, when a larger number of the heads is denoted as m and a smaller number of the heads is denoted as n, a requirement, m=n+odd number, is satisfied, an arrangement or array center of one or a plurality of the preprocessing heads in the main scanning direction coincides with an arrangement or array center of one or a plurality of the postprocessing heads in the main scanning direction, and an arrangement or array center of the preprocessing head and the postprocessing head coincides with an arrangement position of one of the plurality of ink heads in the main scanning direction.

11. The inkjet recording device according to claim 6, further comprising a holding member configured to hold the carriage in a state of being reciprocable in the main scanning direction, wherein the carriage includes an engagement portion that is held by the holding member in a cantilevered state, and the preprocessing head is arranged closer to the engagement portion than the postprocessing head in the conveyance direction.

12. The inkjet recording device according to claim 6, further comprising a holding member configured to hold the carriage in a state of being reciprocable in the main scanning direction, wherein the carriage includes a portion that is held by the holding member in a cantilevered state, and of the preprocessing head and the postprocessing head, the processing head having a smaller number of heads is arranged on the engagement portion side of the carriage.

13. The inkjet recording device according to claim 1, further comprising a holding member configured to hold the carriage in a state of being reciprocable in the main scanning direction, wherein the carriage includes an engagement portion that is held by the holding member in a cantilevered state, and of the ink head and the processing head, the head arranged at a side closest to the engagement portion of the carriage is arranged at a position excluding an end of an array of the ink heads and the processing heads in the main scanning direction.

14. The inkjet recording device according to claim 1, further comprising:

ink sub-tanks configured to supply the ink to each of the plurality of ink heads; and processing solution sub-tanks configured to supply the processing solution to each of the plurality of processing heads, wherein the ink sub-tanks being mounted on the carriage to be aligned in the main scanning direction, and the processing solution sub-tanks being arranged side by side in the main scanning direction at positions different from the ink sub-tanks in the conveyance direction.

15. An inkjet recording device comprising:

a conveyance unit configured to convey a recording medium in a conveyance direction;

a carriage configured to reciprocate in a main scanning direction intersecting the conveyance direction;

a plurality of ink heads located on the carriage, aligned in the main scanning direction, and configured to eject ink for image formation; and a plurality of processing heads located on the carriage and configured to eject a non-coloring processing solution, wherein the plurality of processing heads are arranged side by side in the main scanning direction at positions different from the ink heads in the conveyance direction, wherein the processing heads are partially interposed between a pair of adjacent ink heads in the main scanning direction.

16. An inkjet recording device comprising:

a conveyance unit configured to convey a recording medium in a conveyance direction;

a carriage configured to reciprocate in a main scanning direction intersecting the conveyance direction;

a plurality of ink heads located on the carriage, aligned in the main scanning direction, and configured to eject ink for image formation; and a plurality of processing heads located on the carriage and configured to eject a non-coloring processing solution, wherein the plurality of processing heads are arranged side by side in the main scanning direction at positions different from the ink heads in the conveyance direction, the processing heads are partially adjacent to the ink heads in the main scanning direction and the conveyance direction, the plurality of ink heads include at least a first ink head that ejects ink of a first color and a second ink head that ejects ink of a second color, and when the number of the adjacent processing heads is larger for the first ink head than for the second ink head, the first ink head ejects, as the ink of the first color, ink having a smaller viscosity change due to temperature than the ink of the second color.

* * * * *